US009712732B2

(12) United States Patent
Kaneko et al.

(10) Patent No.: US 9,712,732 B2
(45) Date of Patent: Jul. 18, 2017

(54) IMAGING MODULE, ELECTRONIC DEVICE PROVIDED THEREWITH, AND IMAGING-MODULE MANUFACTURING METHOD

(71) Applicant: FUJIFILM CORPORATION, Tokyo (JP)

(72) Inventors: Yukihiro Kaneko, Saitama (JP); Kenji Yamakawa, Saitama (JP); Yoshiyuki Takase, Saitama (JP); Tatsuya Fujinami, Saitama (JP); Manabu Tobise, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/000,591

(22) Filed: Jan. 19, 2016

(65) Prior Publication Data

US 2016/0134796 A1 May 12, 2016

Related U.S. Application Data

(63) Continuation of application No. PCT/JP2014/067497, filed on Jul. 1, 2014.

(30) Foreign Application Priority Data

Aug. 1, 2013 (JP) ................................ 2013-160620

(51) Int. Cl.
*H04N 5/232* (2006.01)
*H04N 5/225* (2006.01)
(Continued)

(52) U.S. Cl.
CPC ............. *H04N 5/2257* (2013.01); *G02B 7/02* (2013.01); *G02B 7/04* (2013.01); *G03B 5/00* (2013.01);
(Continued)

(58) Field of Classification Search
CPC ...... H04N 5/225; H04N 5/232; H04N 5/2252; H04N 5/2253; H04N 5/2254;
(Continued)

(56) References Cited

U.S. PATENT DOCUMENTS

| 2008/0037970 A1* | 2/2008 | Saito ........................ G03B 5/00 396/55 |
| 2009/0180021 A1 | 7/2009 | Kikuchi et al. |

(Continued)

FOREIGN PATENT DOCUMENTS

| JP | 2010-21985 A | 1/2010 |
| JP | 2010-88088 A | 4/2010 |

(Continued)

OTHER PUBLICATIONS

International Search Report, issued in PCT/JP2014/067497, dated Sep. 22, 2014.

(Continued)

*Primary Examiner* — Lin Ye
*Assistant Examiner* — John H Morehead, III
(74) *Attorney, Agent, or Firm* — Birch, Stewart, Kolasch & Birch, LLP

(57) ABSTRACT

The present invention provides an imaging module, an electric device provided therewith, and an imaging-module manufacturing method capable of simply and reliably performing probing and fixing a lens unit and an imaging element unit to each other with high accuracy even when the miniaturized lens unit is used. A the lens unit (11) includes a focus driving unit, a housing (23), a first connection portion (37A), a first wiring portion by which the focus driving unit and the first connection portion are electrically connected to each other, and a second wiring portion which is electrically connected to the focus driving unit to which the first wiring portion is connected. The second wiring (Continued)

portion extends from the inside of the housing to the outside thereof, and a wire of the second wiring portion extends to an end surface on an end (39) of the extended second wiring portion.

20 Claims, 17 Drawing Sheets

(51) Int. Cl.
*G02B 7/02* (2006.01)
*G02B 7/04* (2006.01)
*G03B 5/00* (2006.01)
*G03B 43/00* (2006.01)

(52) U.S. Cl.
CPC ............. *G03B 43/00* (2013.01); *H04N 5/225* (2013.01); *H04N 5/2252* (2013.01); *H04N 5/2253* (2013.01); *H04N 5/2254* (2013.01); *H04N 5/232* (2013.01); *H04N 5/23287* (2013.01); *G03B 2205/0092* (2013.01)

(58) Field of Classification Search
CPC .... H04N 5/2257; H04N 5/23287; G02B 7/02; G02B 7/04; G03B 5/00; G03B 43/00; G03B 2205/0092
See application file for complete search history.

(56) References Cited

U.S. PATENT DOCUMENTS

| | | | |
|---|---|---|---|
| 2010/0085474 A1 | 4/2010 | Morita | |
| 2011/0134303 A1* | 6/2011 | Jung | H01L 27/14618 348/340 |
| 2012/0033309 A1 | 2/2012 | Yagi | |
| 2013/0342715 A1* | 12/2013 | Nakayama | H04N 5/23287 348/208.11 |
| 2016/0119545 A1* | 4/2016 | Shimizu | G02B 7/08 348/208.13 |
| 2016/0142599 A1* | 5/2016 | Shimizu | G02B 7/04 348/374 |
| 2016/0142605 A1* | 5/2016 | Shimizu | G03B 5/00 348/373 |
| 2016/0142635 A1* | 5/2016 | Kaneko | G03B 5/00 348/208.11 |
| 2016/0323485 A1* | 11/2016 | Shimizu | G03B 17/02 |

FOREIGN PATENT DOCUMENTS

| | | |
|---|---|---|
| JP | 2012-37684 A | 2/2012 |
| JP | 5062537 B2 | 10/2012 |

OTHER PUBLICATIONS

Written Opinion of the International Searching Authority, issued in PCT/JP2014/067497, dated Sep. 22, 2014.

* cited by examiner

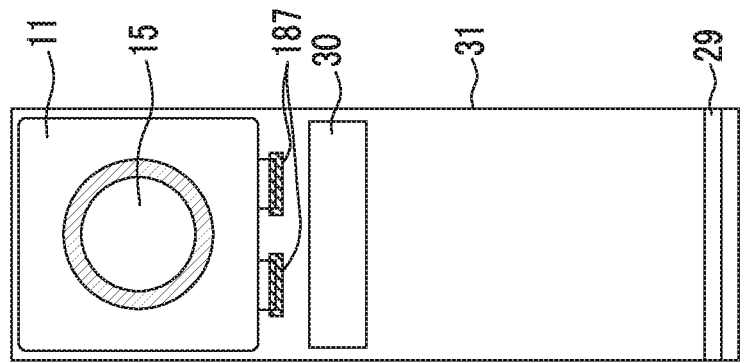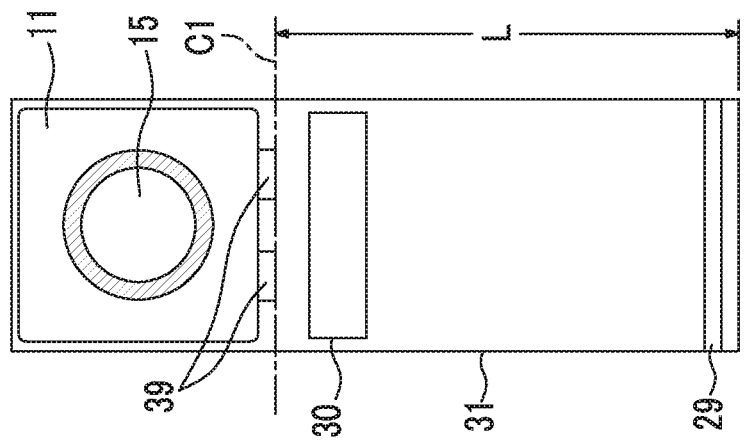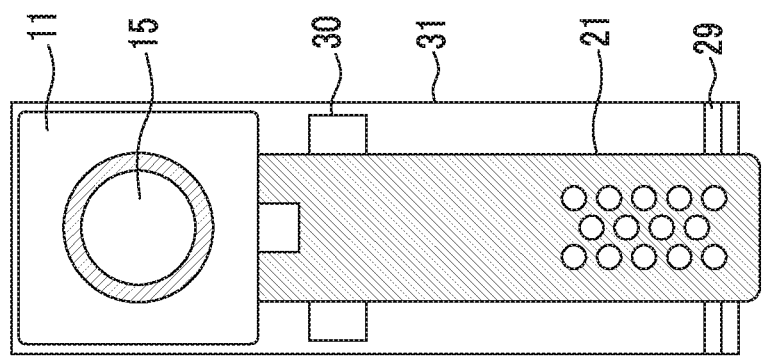

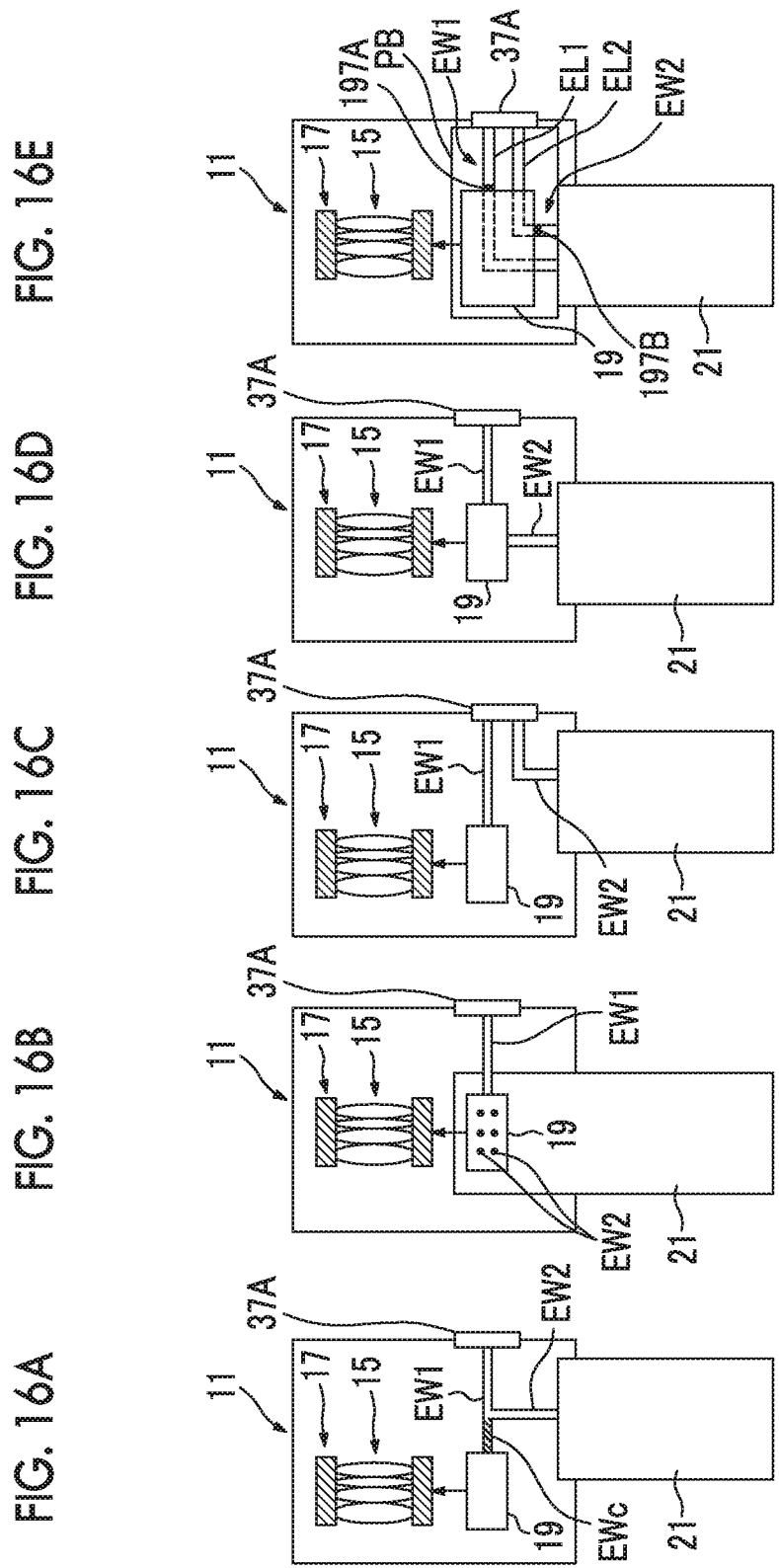

IMAGING MODULE, ELECTRONIC DEVICE PROVIDED THEREWITH, AND IMAGING-MODULE MANUFACTURING METHOD

CROSS-REFERENCE TO RELATED APPLICATIONS

This application is a Continuation of PCT International Application No. PCT/JP2014/067497 filed on Jul. 1, 2014, which claims priority under 35 U.S.C §119 (a) to Japanese Patent Application No. 2013-160620 filed on Aug. 1, 2013. Each of the above application(s) is hereby expressly incorporated by reference, in its entirety, into the present application.

BACKGROUND OF THE INVENTION

1. Field of the Invention

The present invention relates to an imaging module, an electronic device provided therewith, and an imaging-module manufacturing method.

2. Description of the Related Art

A small and thin imaging module is mounted on a portable electronic device such as a portable phone having a photographing function. The imaging module has a structure in which a lens unit, in which a photographic lens is incorporated, is fixed to an imaging element module in which an imaging element such as a Charge Coupled Device (CCD) image sensor or a Complementary Metal-Oxide Semiconductor (CMOS) image sensor is incorporated (refer to JP5062537B and JP2012-37684A). In recent years, as an imaging element which is used in the imaging module, instead of an imaging element having a low pixel number such as approximately one million pixels to two million pixels, an imaging element having a high pixel such as three million pixels to ten million pixels or more is widely used.

A technology which automatically performs positioning of the lens unit and an imaging element unit and fixing of both is disclosed in JP2010-21985A and JP2010-88088A. In this technology, after the lens unit and the imaging element unit are set to an initial position, an image of a measurement chart is captured by the imaging element while the lens unit moves in an optical axis direction, and an adjustment amount which is coincident with a target position is obtained from the obtained captured image. Positional adjustment of the lens unit and the imaging element unit is performed according to the obtained adjustment amount, and the lens unit and the imaging element unit are bonded and fixed in a state where both are coincident with the target position.

SUMMARY OF THE INVENTION

In the lens units of JP2010-21985A and JP2010-88088A, when a control unit positions the lens unit and the imaging element, the lens unit and the imaging element unit are separated from each other. When focus adjustment is performed on the lens unit in the separation state, the control unit causes a probe pin to come into contact with an electric contact provided on an outer circumferential surface of the lens unit and inputs driving signals to a focus adjustment driving unit.

In recent years, in the imaging module, an imaging element having a small pixel pitch is used, and a size of the lens unit is also decreased so as to be approximately several millimeters according to the size of the imaging element. Accordingly, it is not possible to increase a terminal area of each of the adjustment terminals, it is necessary to accurately perform the positioning between the lens unit and the probe electrically connected to the lens unit when the adjustment is performed, and the cost of a manufacturing apparatus of the imaging element unit increases and a manufacturing process is complicated.

An object of the present invention is to provide an imaging module, an electric device provided therewith, and an imaging-module manufacturing method capable of simply and reliably performing probing and fixing the lens unit and the imaging element unit to each other with high accuracy even when a miniaturized lens unit is used.

The present invention includes the following configurations.

(1) An imaging module, including: a lens unit which has a lens group; and an imaging element unit which is fixed to the lens unit and has an imaging element, in which the lens unit includes a focus driving unit which displaces at least a portion of a plurality of lenses configuring the lens group in an optical axis direction of the lens group with respect to the imaging element, a housing in which the focus driving unit is accommodated, a first connection portion which is electrically connected to the imaging element unit, a first wiring portion by which the focus driving unit and the first connection portion are electrically connected to each other, and a second wiring portion which is electrically connected to the focus driving unit to which the first wiring portion is connected, in which the second wiring portion extends from the inside of the housing to the outside thereof, and a wire of the second wiring portion extends to an end surface on an end of the extended second wiring portion.

(2) An electronic device including the imaging module.

(3) A manufacturing method of an imaging module including a lens unit which has a lens group, and an imaging element unit which is fixed to the lens unit and has an imaging element, the lens unit including a focus driving unit which displaces at least a portion of a plurality of lenses configuring the lens group with respect to the imaging element, a housing in which the focus driving unit is accommodated, a first connection portion which is electrically connected to the imaging element unit, a first wiring portion by which the focus driving unit and the first connection portion are electrically connected to each other, and a second wiring portion which is electrically connected to the focus driving unit to which the first wiring portion is connected, the manufacturing method of an imaging module includes: a process of preparing the lens unit and the imaging element unit; a process of setting the lens unit and the imaging element unit on an axis orthogonal to a measurement chart; a process of obtaining a captured image by imaging an image of the measurement chart, in which an image is formed by the lens unit using the imaging element, in a state where at least one of the measurement chart, the lens unit, and the imaging element unit sequentially moves to a plurality of imaging positions on the axis and the focus driving unit is driven using the second wiring portion; a process of calculating an adjustment amount by which positions and postures of the lens unit and the imaging element unit are adjusted using the captured image obtained at each imaging position; a process of moving the lens unit and the imaging element unit relative to each other according to the calculated adjustment amount; a process of fixing the lens unit and the imaging element unit which are moved relative to each other; and a process of cutting a portion including the wire of the second wiring portion.

According to the present invention, even when a miniaturized lens unit is used, it is possible to simply and reliably perform probing and to fix the lens unit and the imaging element unit to each other with high accuracy.

BRIEF DESCRIPTION OF THE DRAWINGS

FIGS. 12A to 12C are process explanatory views showing a cutting process of the flexible substrate stepwise.

FIGS. 16A to 16E are schematic configuration views of the lens unit showing examples of a connection aspect between a first wire and a second wire.

DESCRIPTION OF THE PREFERRED EMBODIMENTS

Hereinafter, embodiments of the present invention will be described with reference to the drawings.

<Configuration of Imaging Module>

Figure 1:
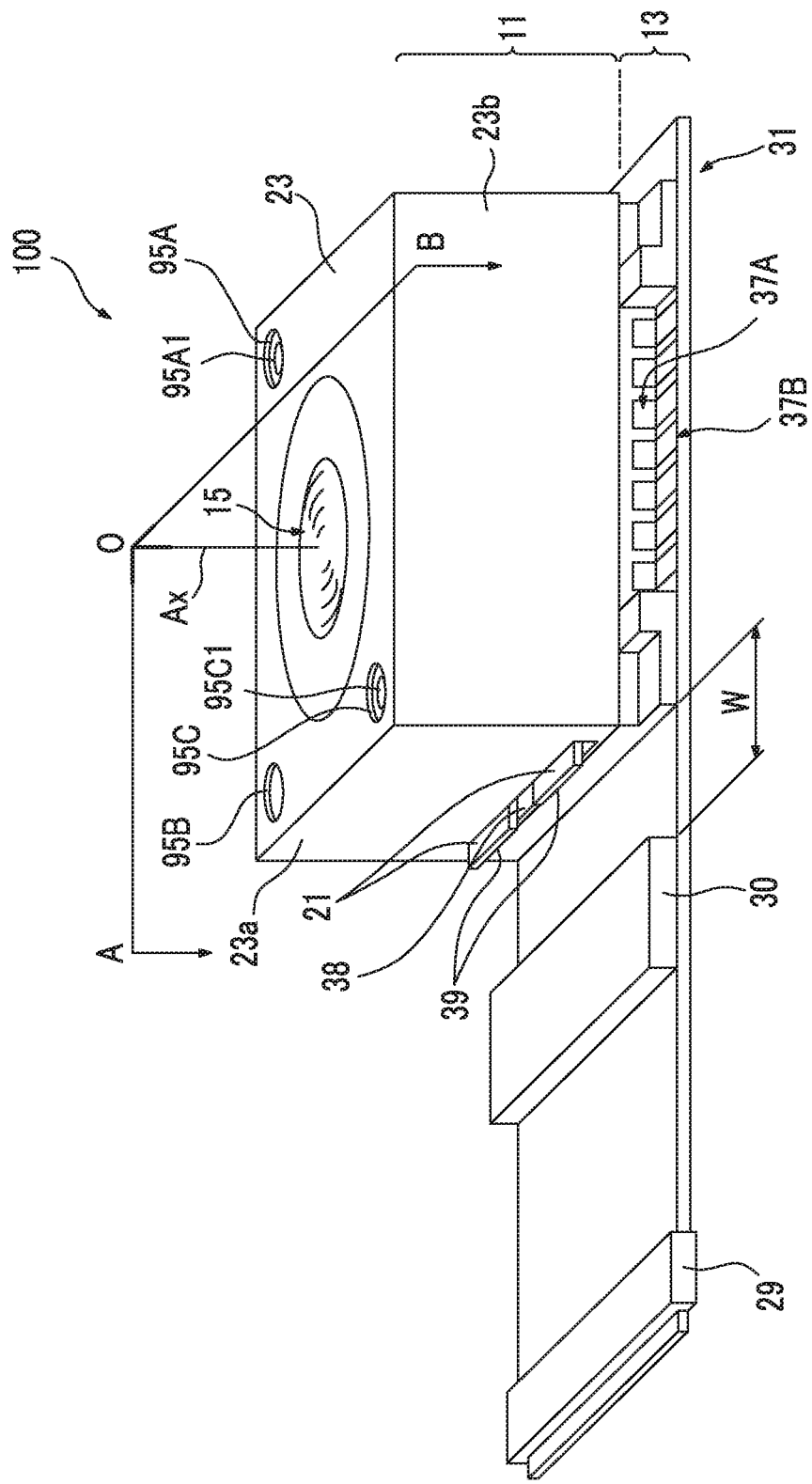
FIG. 1 is an external perspective view of an imaging module for explaining an embodiment of the present invention.
Figure 2:
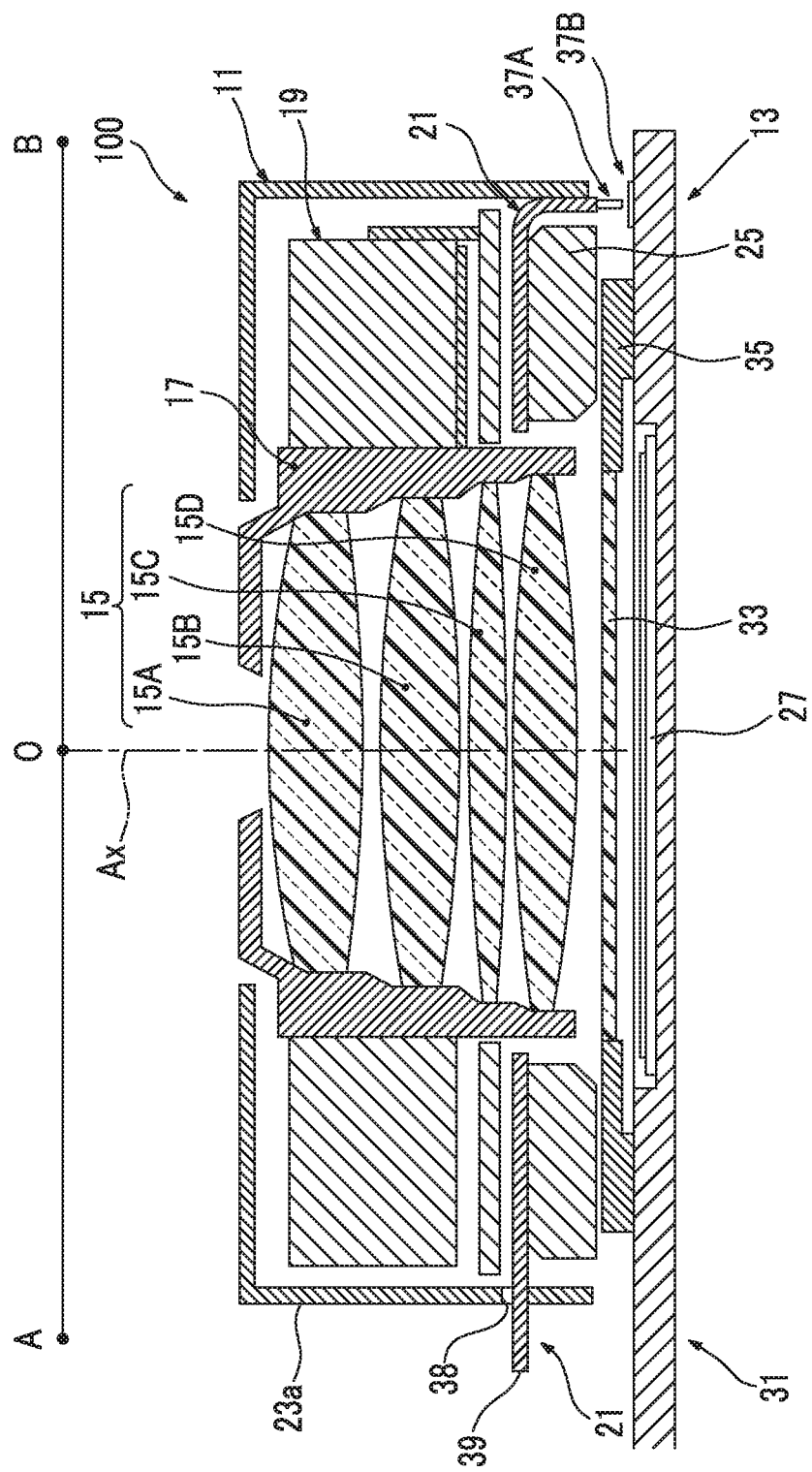
FIG. 2 is a sectional view taken along line A-O-B of FIG. 1.

FIG. 1 is an external perspective view of an imaging module for explaining an embodiment of the present invention. FIG. 2 is a sectional view taken along line A-O-B of FIG. 1. Hereinafter, in descriptions of each drawing, a common reference numeral is assigned to the overlapping same members, and the description with respect to each member is omitted or simplified.

As shown in FIG. 1, an imaging module 100 includes a lens unit 11, and an imaging element unit 13 which is fixed to the lens unit 11. The lens unit 11 forms an image of a photographic subject on an imaging element included in an imaging element unit 13. The imaging element unit 13 outputs captured image signals.

As shown in FIG. 2, the lens unit 11 includes a lens group 15 (in the shown example, a lens group including lenses 15A, 15B, 15C, and 15D is shown, however, the present invention is not limited to this), a lens barrel 17 which supports the lens 15, a lens drive unit 19, a flexible substrate (FPC: flexible printed circuits) 21, a housing 23, and a bottom block 25. The lens drive unit 19 is accommodated inside the housing 23, and the outside of the lens unit 11 is covered by the housing 23. The bottom block 25 is disposed on a bottom portion inside the housing 23, and closes an outer circumferential portion of the lens barrel 17.

The imaging element unit 13 includes an imaging element 27, an element fixing substrate 31 on which the imaging element 27 is mounted, a cover glass 33, and a cover holder 35. The element fixing substrate 31 includes an external connection portion 29 which is electrically connected to an external device. The cover holder 35 holds the cover glass 33 and is fixed to the element fixing substrate 31.

The imaging element 27 is configured of a CCD image sensor, a CMOS image sensor, or the like. The imaging element 27 has three million pixels to ten million pixels or more, and for example, a pixel pitch of the imaging element 27 is 1 μm or less. Here, the pixel pitch means the minimum distance among distances between centers of photoelectric conversion regions included in pixels provided in the imaging element 27.

As shown in FIG. 1, the element fixing substrate 31 is a rectangular substrate, the imaging element 27 (refer to FIG. 2) is mounted on one end side in both ends in a longitudinal direction of the substrate, and the external connection portion 29 is disposed on the tip portion of the other end side.

The element fixing substrate 31 includes a support portion which supports the imaging element 27, the external connection portion 29 which is electrically connected to the outside of the imaging element unit 13, and an element wiring portion which electrically and physically connects the support portion and the external connection portion 29, on one substrate.

The lens unit 11 and the imaging element unit 13 are formed as separate units, and a mutual position and a mutual posture are adjusted using the image imaged by the imaging element 27 through the lens unit 11. That is, the lens unit 11 and the imaging element unit 13 are adjusted such that an image forming surface of the photographic subject formed by the lens unit 11 is coincident with the imaging surface of the imaging element 27 of the imaging element unit 13. In the adjusted state, by bonding and fixing the lens unit 11 and the imaging element unit 13 to each other, and a product of the imaging module is completed.

Unit connection portions (first connection portions) 37A and 37B, which are electrically connected to each other in the state where both are fixed to each other, are respectively provided in the lens unit 11 and the imaging element unit 13. The unit connection portion 37A is configured of a plurality of comb-like terminals, and the unit connection portion 37B is configured of a plurality of electrode pads which are disposed corresponding to terminals of the unit connection portion 37A. The unit connection portions 37A and 37B are electrically connected to each other by allowing the unit connection portions 37A and 37B to come into contact with each other or by soldering the unit connection portions 37A and 37B.

The lens drive unit 19 includes a focus driving unit which moves the lens barrel 17 supporting the lens group 15 along a lens optical axis Ax with respect to the imaging element 27 so as to perform focus adjustment. In addition, the lens drive unit 19 includes two image-blur correction driving units which move the imaging element 27 in a direction perpendicular to the lens optical axis Ax or incline the imaging element 27 from a surface orthogonal to the lens optical axis Ax so as to perform image-blur correction driving of hand shake correction or the like, and drives the two image-blur correction driving units if necessary.

The lens drive unit 19 may perform focus adjustment and image-blur correction by displacing at least a portion of the lenses of the lens group 15.

Although the flexible substrate 21 will be described in detail below, the flexible substrate 21 is a wiring substrate which is used so as to perform positioning (optical axis adjustment) of the lens unit 11 and the imaging element unit 13 and electrically connect the external device including the imaging element unit 13 or the like to the outside, and the flexible substrate 21 is supported by the bottom block 25 inside the housing 23. By using a flexible substrate 21 which is ductile, it is possible to increase a degree of freedom with respect to handling of wiring or layout of a connection terminal.

The flexible substrate 21 has a lens driving wire (first wiring portion) which includes a plurality of wires through which the unit connection portion 37A and the lens drive unit 19 are electrically connected to each other. The lens driving wire is a wire which is mainly used after the imaging module is made to be a product. In addition, the flexible substrate 21 has an adjustment wire (second wiring portion) which includes a plurality of wires through which an adjustment terminal portion described below and the lens drive unit 19 are electrically connected to each other. However, a portion of the flexible substrate 21 shown in FIGS. 1 and 2 is cut, and the adjustment terminal portion is removed. The adjustment wire is a wire which is conducted with both the focus driving unit and the image-blur correction driving unit of the lens drive unit 19 connected to the lens driving wire, or a wire which is conducted with at least the focus driving unit. In addition, the adjustment wire is electrically connected to a portion of wires which are conducted with at least the focus driving unit in the lens driving wires, or is electrically connected to a connection portion which is conducted with at least the focus driving unit of the unit connection portion 37A. The lens drive unit 19 is connected to the wires of two systems, such as the lens driving wire connected to the unit connection portion 37A and the adjustment wire which independently adjusts the lens unit 11, through the flexible substrate 21.

After the lens unit 11 and the imaging element unit 13 are fixed to each other, in the flexible substrate 21 shown in FIGS. 1 and 2, a portion which is unnecessary in the flexible substrate 21 is cut. In the flexible substrate 21 shown FIG. 1, two ends 39 and 39 of the flexible substrate 21 are cut portions in which the unnecessary portions are cut.

Figure 3:
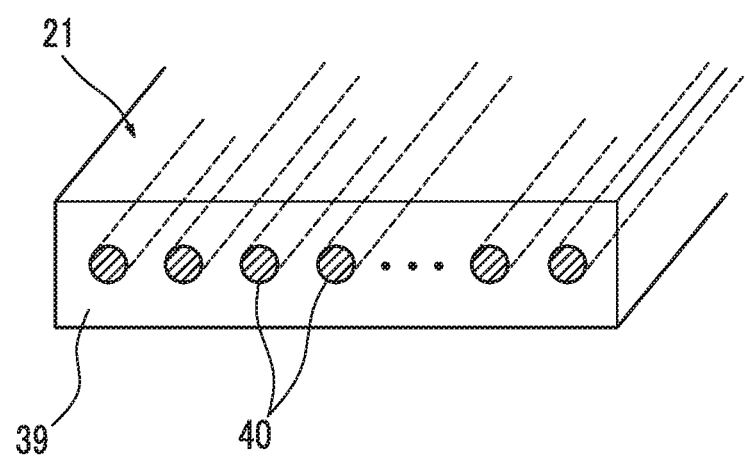
FIG. 3 is a schematic enlarged view of an end of a flexible substrate.

FIG. 3 is a schematic enlarged view of the end 39 of a flexible substrate 21. In the end surface of the end 39 of the flexible substrate 21, cut wiring portions 40 in which a portion of wires including the adjustment wires are cut are included. Insulation treatment is performed on the end 39. In the cut wiring portion 40, the end surface of the wire of at least the second wiring portion is covered by an insulating material. Accordingly, short circuiting of each cut wire is prevented.

Driving signals for performing focus driving and image-blur correction driving for hand shake correction are input to or output from the lens drive unit 19 shown in FIG. 2 through the unit connection portion 37A of the flexible substrate 21. In addition, before the lens unit 11 and the imaging element unit 13 are fixed to each other, in a state where the unit connection portions 37A and 37B are not electrically connected to each other, the driving signals are input to or output from the lens drive unit 19 through the adjustment terminal portion (not shown) which is included in the flexible substrate 21 before the flexible substrate 21 is cut and the adjustment wire which is electrically connected to the adjustment terminal portion. Accordingly, the lens drive unit 19 is driven through the adjustment wire. The driving signals include driving power for driving the focus driving unit and the image-blur correction driving unit and output signals from a sensor.

The adjustment terminal portion, through which driving signals for adjustment are input to or output from the lens drive unit 19, is not disposed on a side surface of the housing 23 of the lens unit 11 shown in FIG. 1 and is disposed on a portion of the flexible substrate 21 which extends from the inside of the housing 23 of the lens unit 11 to the outside of the housing 23. Accordingly, in order to control the lens in a multi-axial manner, even in a lens unit in which the plurality of adjustment terminals are required so as to drive the lens, a terminal area of each adjustment terminal does not decrease, and it is possible to perform reliable probing in a state where a wide terminal area is maintained.

The two ends 39 of the flexible substrate 21 are disposed in a state where the ends 39 extend from the side surface 23a of the housing 23 of the lens unit 11 in a direction facing the external connection portion 29 to the outside of the housing 23 of the lens unit 11. In other words, the extension portion of the flexible substrate 21 extends from the housing 23 in a direction in which the element wiring portion connected to the external connection portion 29 extends from the support portion of the element fixing substrate 31.

According to the configuration, the extension portion of the flexible substrate 21 is disposed at a position at which a projection area with respect to the extension portion of the flexible substrate 21 when the extension portion of the flexible substrate 21 is projected in the optical axis direction of the lens group is within a projection area of the imaging element unit 13 when the imaging element unit 13 is projected in the optical axis direction of the lens group. Accordingly, the extension portion of the flexible substrate 21 does not protrude outside the substrate surface of the element fixing substrate 31, and interference between the extension portion and an external member is avoided.

The unit connection portions 37A and 37B are disposed along another side surface 23b adjacent to the side surface 23a. That is, the unit connection portions 37A and 37B are disposed on the side surface 23b different from the side surface 23a of the lens unit 11 on which the end 39 of the cut flexible substrate 21 is disposed. The extension portion of the flexible substrate 21 and the unit connection portion 37A are disposed on the side surfaces of the housing 23 different from each other, and it is possible to simplify the configuration of the flexible substrate 21.

A protrusion 30 is disposed on the substrate surface on the same side as the side on which the imaging element 27 of the element fixing substrate 31 is mounted. The protrusion 30 is disposed with a gap of a distance W from the side surface 23a of the substrate extension side of the housing 23.

The protrusion 30 is used as a pedestal by which the substrate surface is supported on the element fixing substrate 31 at the time of the cutting of the extension portion of the flexible substrate 21 described below. The gap of the distance W becomes a cutting margin of the flexible substrate 21. The top surface of the protrusion 30 has a flat surface which is parallel to the imaging surface of the imaging element 27. The protrusion 30 may be a member dedicated for the pedestal. However, for example, as the protrusion 30, an electric component such as an IC mounted on the element fixing substrate 31 may be used, in which a member such as an electromagnetic shield material or a protective material is coated on the outer surface of the electronic component.

The lens drive unit 19 is accommodated inside the housing 23 of the lens unit 11, and the housing 23 is disposed so as to cover the cover glass 33 and the cover holder 35 on the element fixing substrate 31. An opening 38 is formed on the side surface 23a of the housing 23 facing the external connection portion 29 of the element fixing substrate 31. As shown in FIG. 1, the end 39 of the flexible substrate 21 protrudes outward from the opening 38 of the side surface 23a of the housing 23, and is disposed between the opening 38 of the housing 23 and the protrusion 30 along the longitudinal direction of the element fixing substrate 31.

In FIGS. 1 and 2, the end 39 of the flexible substrate 21 extends outside the housing 23. Instead of this configuration, the end surface of the end 39 may be coincident with the side surface 23a of the housing 23, or the end 39 may be disposed inside the housing 23. The end 39 of the flexible substrate 21 exists within a unit disposition region in which the lens unit 11 and the imaging element unit 13 including the element fixing substrate 31 are projected in the lens optical axis Ax direction, on a surface perpendicular to the lens optical axis Ax.

Figure 4:
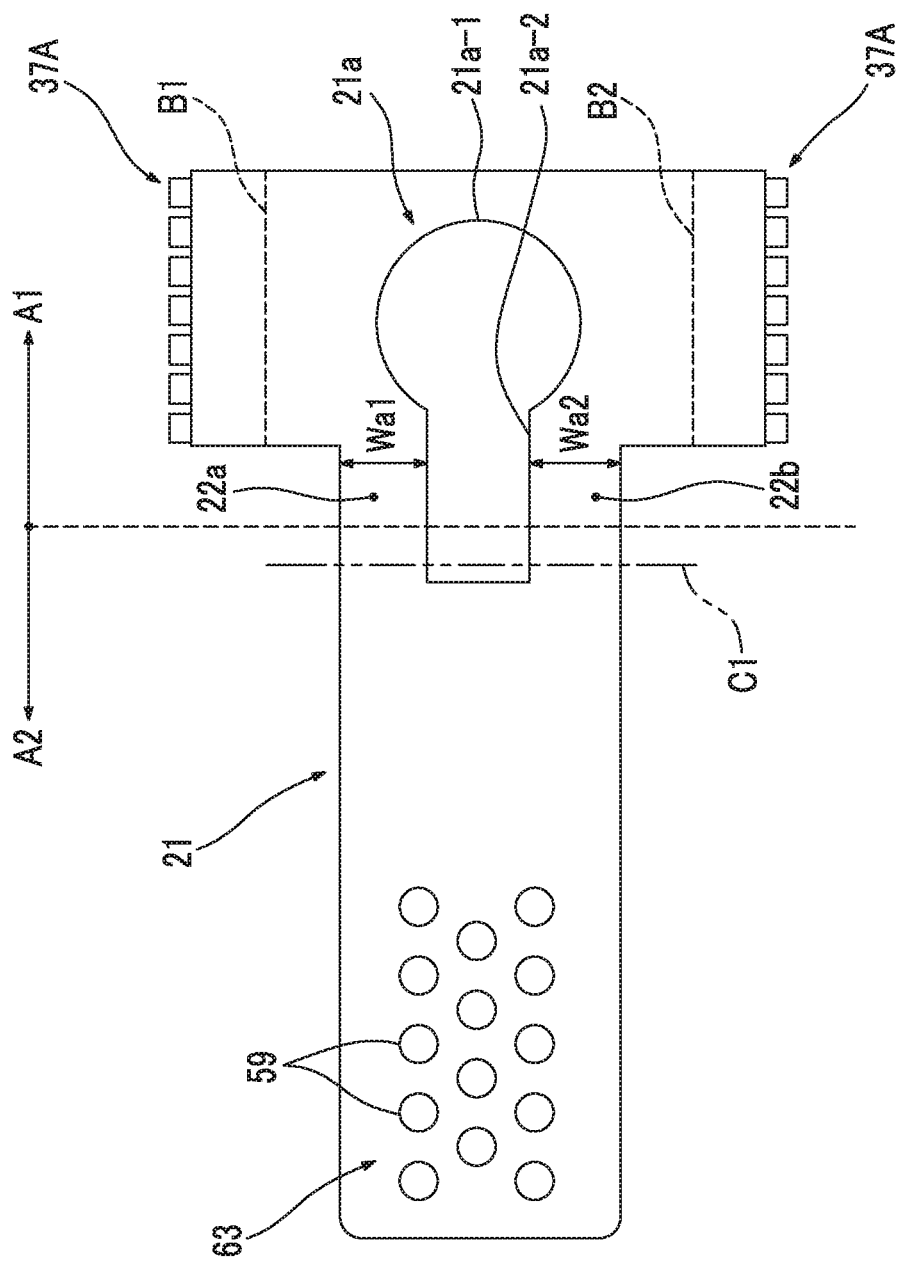
FIG. 4 is a plan view showing the flexible substrate before the flexible substrate is cut.

FIG. 4 shows a plan view of the flexible substrate 21 before the flexible substrate 21 is cut. The flexible substrate 21 shown in FIGS. 1 and 2 is the flexible substrate 21 after being cut along a cutting line C1 shown in FIG. 4.

The flexible substrate 21 includes a support region A1 which is the side supported inside the housing 23 of the lens unit 11, and an extension region A2 which is the side extending outside the housing 23.

The flexible substrate 21 includes a pair of unit connection portions 37A and 37A on the support region A1, and is perpendicularly bent at fold lines B1 and B2. As shown in FIG. 1, the flexible substrate 21 is bent at the fold lines B1 and B2, and the unit connection portions 37A and 37A are suspended with respect to the unit connection portion 37B of the element fixing substrate 31 side and are disposed so as to face the unit connection portion 37B.

An opening portion 21a is formed in the support region A1 of the flexible substrate 21. The opening portion 21a includes a circular hole portion 21a-1, and a rectangular hole portion 21a-2 which extends along the extension direction of the extension region A2 from the circular hole portion 21a-1.

The circular hole portion 21a-1 is a hole into which the lens barrel 17 is inserted. The rectangular hole portion 21a-2 protrudes from the support region A1 of the flexible substrate 21 toward the extension region A2, and extends to a position at which the rectangular hole portion 21a-2 is positioned outside the housing 23.

Since the flexible substrate 21 has the rectangular hole portion 21a-2, two divided wiring portions 22a and 22b are formed on a boundary portion between the support region A1 and the extension region A2. A width Wa1 of the divided wiring portion 22a and a width Wa2 of the divided wiring portion 22b in a direction orthogonal to the extension direction of the flexible substrate 21 are the same as each other. That is, the flexible substrate 21 includes the two divided wiring portions 22a and 22b which are symmetrically divided in a state where a center surface which includes the lens optical axis Ax along a plane and is parallel to the direction of the flexible substrate 21 extending from the housing 23 is interposed between the two divided wiring portions 22a and 22b. That is, the flexible substrate includes the divided wiring portions 22a and 22b which are symmetrically divided with respect to a straight line which is orthogonal to the lens optical axis Ax and is parallel to the direction of the flexible substrate 21 extending from the housing 23. In the shown example, the number of the divided wiring portions 22a and 22b is two. However, the wiring portion may be divided in plural sections.

Since the divided wiring portions 22a and 22b are formed on the flexible substrate 21, it is possible to decrease a cutting distance of the flexible substrate 21. In addition, it is possible to dispose wires so as to avoid the lens group 15 which is inserted into the circular hole portion 21a-1. In addition, when adjustment is performed, in which the lens optical axis of the lens unit 11 moves so as to be parallel to a normal line of the imaging surface of the imaging element and is inclined to the normal line, using an imaging module manufacturing apparatus described in detail below, it is possible to decrease resistance of the lens group 15 which receives from the flexible substrate 21.

The flexible substrate 21 includes an adjustment terminal portion 63 (second connection portion), in which a plurality of adjustment terminals 59 are disposed, on a tip side of the extension region A2 opposite to the support region A1. The adjustment terminal portion 63 includes the plurality of adjustment terminals 59 which are formed by exposing conductive portions of a portion of wires of the flexible substrate 21. A probe pin described in detail below comes into contact with each adjustment terminal 59 of the adjustment terminal portion 63 when the lens unit 11 and the imaging element unit 13 are fixed to each other. Driving signals which drive the focus driving unit and each image-blur correction driving unit are input to the lens drive unit 19 through the probe pin from the adjustment terminals 59.

The plurality of adjustment terminals 59 are arranged with equal intervals in a plurality of rows. The adjustment terminals 59 are disposed so as to be deviated by ½ pitch of the disposition pitch of the adjustment terminals 59 in each row, and the adjustment terminals 59 adjacent in an arrangement direction of the rows are alternately disposed. According to the disposition pattern of the adjustment terminals 59, it is possible to further increase space efficiency.

In the imaging module 100 having the above-described configuration, the lens drive unit 19 shown in FIG. 2 moves the lens barrel 17 along the lens optical axis Ax with respect to the imaging element 27, and a focusing operation is performed. In addition, the lens drive unit 19 moves the lens barrel 17 in a direction orthogonal to the lens optical axis Ax with respect to the imaging element 27 or inclines the lens barrel 17 from a plane orthogonal to the lens optical axis Ax, and an image-blur correction operation such as hand shake correction is performed.

Moreover, in the imaging module 100, the focusing operation and the image-blur correction operation may be simultaneously performed, only one of the two operations may be selectively performed, and each operation may be performed at an arbitrary timing if necessary.

The adjustment terminal portion 63 of the present imaging module 100 is formed on the flexible substrate 21. Accordingly, even when a miniaturized lens unit is used, it is possible to install each adjustment terminal 59 on a wide terminal area on the flexible substrate 21, and it is possible to perform reliable probing.

Moreover, in the present imaging module 100, the imaging element 27 in which the pixel pitch is 1 μm or less is used. In an imaging element having a narrow pixel pitch, since a pixel size is small and light receiving sensitivity decreases, it is necessary to combine a lens having a small F number. Accordingly, a focal depth of the lens decreases, a phenomenon in which resolving power decreases in only one direction around a screen is likely to occur, and high accuracy is required for assembling the lens. Particularly, when the pixel pitch of the imaging element is 1 μm or less, it is difficult to adjust the lens, and there is a disadvantage in which man-hours of the manufacturing process increase. However, in the imaging module 100 having the present configuration, since the terminal area of the adjustment terminal portion 63 can be largely secured, it is possible to realize stable probing, and it is possible to position the lens unit 11 and the imaging element unit 13 with high accuracy.

Next, the lens drive unit 19 included in the lens unit 11 and the wires of the lens drive unit 19 will be described in detail.

Figure 5:
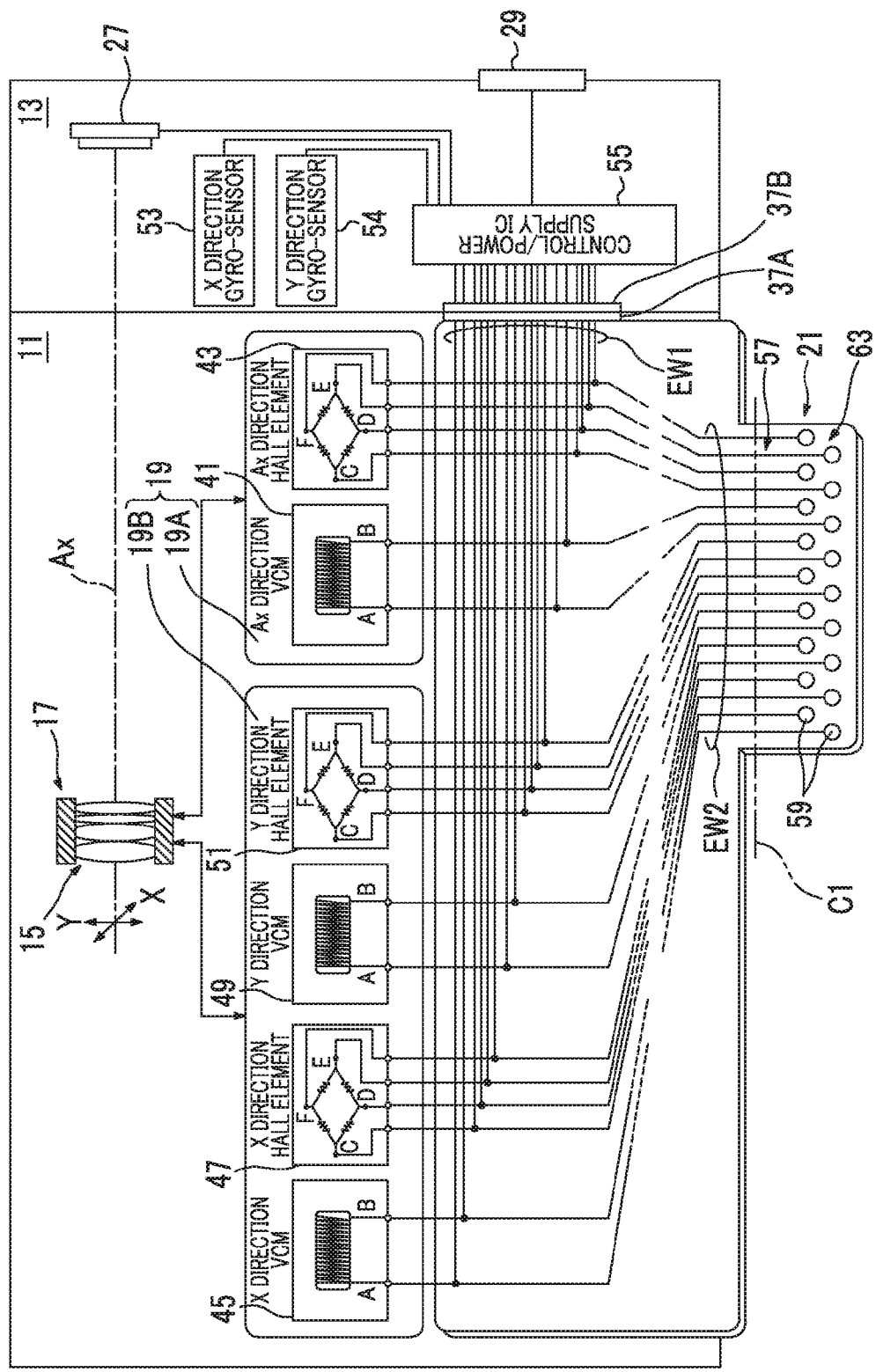
FIG. 5 is a schematic wiring diagram of a lens unit and an imaging element unit.

FIG. 5 shows a schematic wiring diagram of the lens unit 11 and the imaging element unit 13. In addition, FIG. 5 shows the state before the flexible substrate 21 is cut. The aspect of wiring shown in FIG. 5 is an example, and the present invention is not limited to this. The lens drive unit 19 includes a focus drive unit 19A which performs focus adjustment and an image-blur correction drive unit 19B which performs image-blur correction. In the focus drive unit 19A and the image-blur correction drive unit 19B, a Voice Coil Motor (VCM) is used as a driving unit for driving the lens, and a hall element is used as a sensor which detects the position of the lens. In addition, the VCM or the hall element is an example, the present invention is not limited to this, and other devices may be used.

The focus drive unit 19A includes an Ax direction VCM 41 which is a focus driving unit which drives the lens barrel 17 along the lens optical axis Ax, and an Ax direction hall element 43 which detects the position of the lens in an Ax direction.

The image-blur correction drive unit 19B includes an X direction VCM 45 which is a first image-blur correction driving unit driven along a horizontal direction X (first direction) perpendicular to the lens optical axis Ax, and an X direction hall element 47 which detects the position of the lens in an X direction. In addition, the image-blur correction drive unit 19B includes a Y direction VCM 49 which is a second image-blur correction driving unit driven along a Y direction (second direction) perpendicular to the lens optical axis Ax and the X direction, and a Y direction hall element 51 which detects the position of the lens in the Y direction. In addition, the image-blur correction drive unit 19B may be a driving mechanism which inclines the lens. In this case, the driving mechanism may use a well-known driving mechanism, and here, descriptions thereof are omitted.

The lens unit 11 includes a first wiring portion EW1 which is the above-described lens driving unit by which the lens drive unit 19 and the unit connection portion 37A of the lens unit 11 side are electrically connected to each other, and a second wiring portion EW2 which is the above-described adjustment wire which is electrically connected to the lens drive unit 19. The first wiring portion EW1 and the second wiring portion EW2 are formed in the flexible substrate 21.

In a wiring pattern of the flexible substrate 21, the first wiring portion EW1 mainly connects the wire of the lens drive unit 19 and the unit connection portion 37A, and the second wiring portion EW2 mainly connects the wire of the lens drive unit 19 and each adjustment terminal 59 of the adjustment terminal portion 63.

The first wiring portion EW1 includes a plurality of wires which are conducted with the driving units (the Ax direction VCM 41, the X direction VCM 45, and the Y direction VCM 49) and the sensors (the Ax direction hall element 43, the X direction hall element 47, and the Y direction hall element 51).

The second wiring portion EW2 includes a wire which is conducted with each device of the driving units (the Ax direction VCM 41, the X direction VCM 45, and the Y direction VCM 49) connected to the first wiring portion EW1 and the sensors (the Ax direction hall element 43, the X direction hall element 47, and the Y direction hall element 51). Accordingly, the second wiring portion EW2 is electrically connected to the driving units, the sensors, the wires, and the unit connection portion 37A which is connected to the driving units, the sensors, and the wires.

Since the wires of the second wiring portion EW2 are connected to the wires of the first wiring portion EW1, driving each of the above-described driving units through the first wiring portion EW1 and obtaining detected signals from each of the above-described sensors through the first wiring portion EW1 can be similarly performed through the second wiring portion EW2.

In addition, in the above-described configuration, two contacts (contacts A and B with respect to a coil) are provided with respect to one driving unit 1 and four contacts (contacts C, D, E, and F with respect to a bridge circuit) are provided with respect to one sensor. However, this is an example, and the number of contacts is different according to a kind of the driving unit or the sensor. In addition, when the lens is controlled in a multi-axial manner, since the number of the required contacts or the number of the required wires increases regardless of the kind of the driving unit or the sensor, it is necessary to particularly increase an installation area of the adjustment terminal 59.

The imaging element unit 13 includes the imaging element 27, an X direction gyro-sensor 53 which detects an angular speed in the X direction, a Y direction gyro-sensor 54 which detects an angular speed in the Y direction, and a control/power supply IC 55. The control/power supply IC 55 drives the image-blur correction drive unit 19B according to the angular speed in each direction which is detected by the X direction gyro-sensor 53 and the Y direction gyro-sensor 54 after the imaging module is manufactured. In addition, the control/power supply IC 55 controls the imaging element 27, outputs imaging signals, and controls power supply with respect to the entire system.

The first wiring portion EW1 of the lens unit 11 is connected to the control/power supply IC 55 via the unit connection portions 37A and 37B. The imaging element 27, the X direction gyro-sensor 53, and the Y direction gyro-sensor 54 are connected to the control/power supply IC 55, and the control/power supply IC 55 is connected to the external connection portion 29.

In the shown example, the second wiring portion EW2 is connected to the X direction VCM 45, the X direction hall element 47, the Y direction VCM 49, and the Y direction hall element 51 of the image-blur correction drive unit 19B. However, when any one of the X direction and the Y direction is not required and driving in the X direction and the Y direction is not required, the wires of the VCM and the hall element corresponding to the driving direction which is not required may be omitted.

In the end 39 of the above-described flexible substrate 21 shown in FIG. 3, the wires of the second wiring portion EW2 extend to the end surface. Accordingly, the wire of the cut wiring portion 40 which is formed on the cut end 39 of the flexible substrate 21 includes a wire which is electrically connected to at least one of the first wiring portion EW1 connected to the focus drive unit 19A, the image-blur correction drive unit 19B, and the focus drive unit 19A, the first wiring portion EW1 connected to the image-blur correction drive unit 19B, or the unit connection portion 37A.

In the lens unit 11 and the imaging element unit 13 configured as described above, optical axis alignment is performed using the second wiring portion EW2 of the flexible substrate 21 in a state before the flexible substrate 21 is cut. In addition, in a state where the lens unit 11 and the imaging element unit 13 are fixed to each other, a portion of the flexible substrate 21 is cut.

Figure 6:
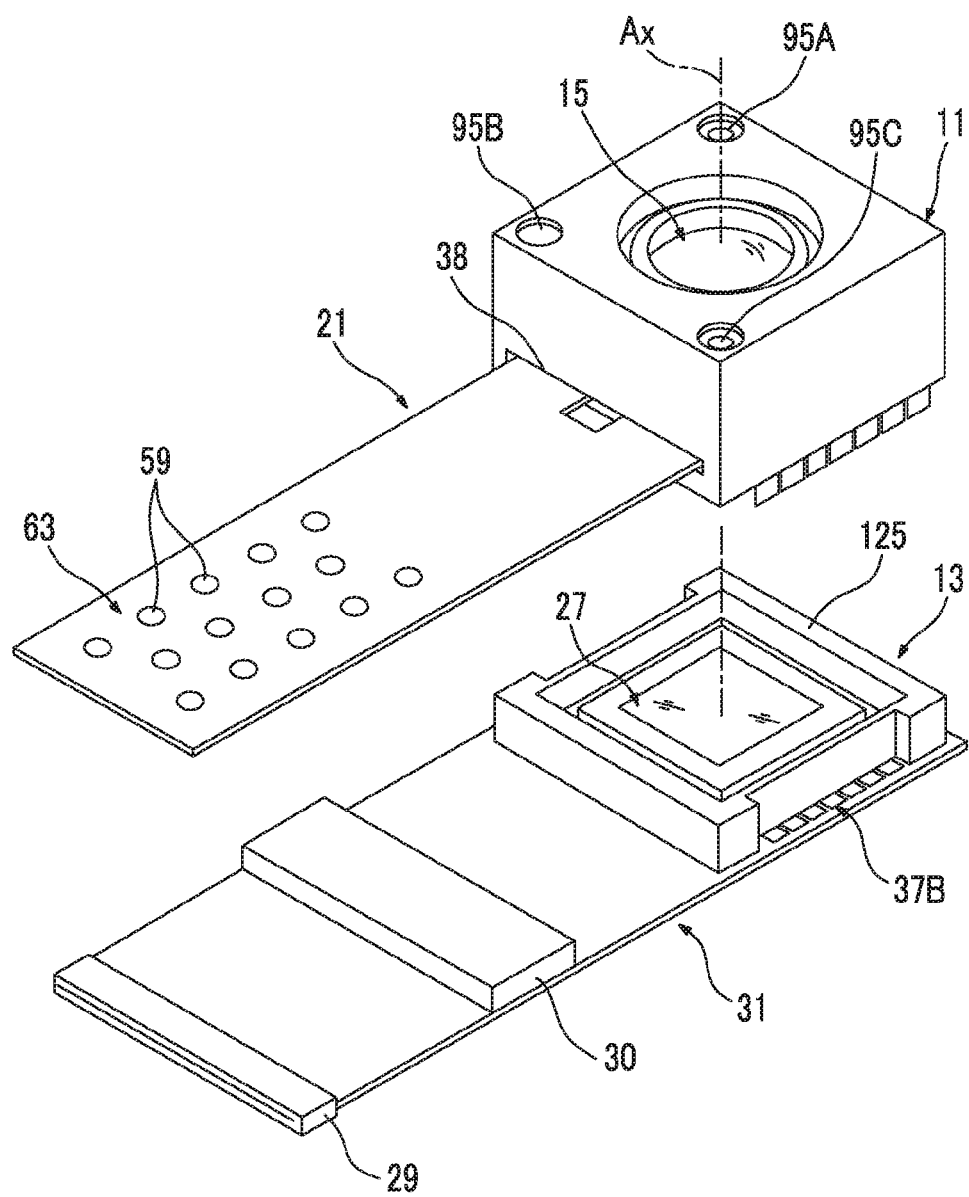
FIG. 6 is a perspective view showing a state before the lens unit and the imaging element unit are fixed to each other.
Figure 7:
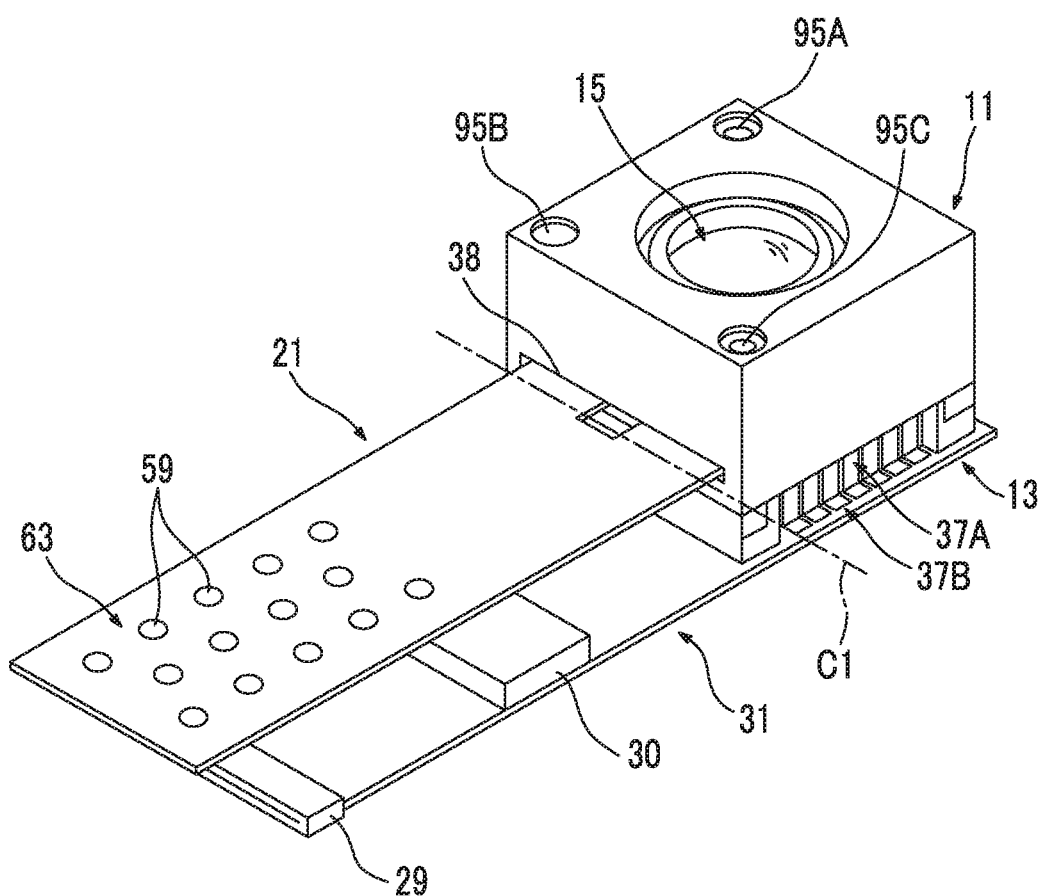
FIG. 7 is a perspective view showing a state after the lens unit and the imaging element unit are fixed to each other.

FIG. 6 is a perspective view showing a state before the lens unit 11 and the imaging element unit 13 are fixed to each other, and FIG. 7 is a perspective view showing a state after the lens unit 11 and the imaging element unit 13 are fixed to each other.

As shown in FIG. 6, the lens unit 11 and the imaging element unit 13 are fixed to each other in a direction in which the flexible substrate 21 extending from the housing 23 of the lens unit 11 and the element fixing substrate 31 of the imaging element unit 13 overlap each other in the direction of the lens optical axis Ax. That is, the extension direction in which the flexible substrate 21 extends is the same as a direction facing the external connection portion 29 from a mounting region of the imaging element 27 of the element fixing substrate 31, that is, a direction facing the external connection portion 29 from a center portion of the imaging element 27. Accordingly, when a portion of the flexible substrate 21 is cut, the flexible substrate 21 does not interfere with other components around the flexible substrate 21.

When the lens unit 11 and the imaging element unit 13 are adjusted so as to be fixed to each other, focus driving signals for performing a focusing operation or driving signals for driving the image-blur correction driving mechanism are input from the adjustment terminal portion 63 of the flexible substrate 21 to the lens unit 11. Accordingly, even when the unit connection portion 37A and the unit connection portion 37B are not electrically connected to each other, the lens unit 11 can drive the above-described lens drive unit 19 (refer to FIG. 2) of the lens unit 11.

When the lens unit 11 and the imaging element unit 13 are fixed to each other, the imaging is performed using the second wiring portion EW2 in a state where the lens drive unit 19 is driven. From the captured images which are obtained, an optical image forming surface formed by the lens unit 11 is calculated, and positioning is performed such that the imaging surface of the imaging element 27 is coincident with an optical image forming surface of the photographic subject image formed by the lens unit 11. In addition, as shown in FIG. 7, the lens unit 11 and the imaging element unit 13 are fixed to each other by an adhesive agent in the state where the lens unit 11 and the imaging element unit 13 are positioned.

After the lens unit 11 and the imaging element unit 13 are fixed to each other, the flexible substrate 21 is cut along the cutting line C1, and an unnecessary extension portion including the adjustment terminal portion 63 of the flexible substrate 21 is removed. Accordingly, the imaging module 100 shown in FIG. 1 is completed. The above-described series of processes are performed by the imaging module manufacturing apparatus described below.

<Configuration of Imaging Module Manufacturing Apparatus>

The configuration of the imaging module manufacturing apparatus of manufacturing the imaging module 100 will be described. Here, the imaging module manufacturing apparatus shown here schematically performs the following processes sequentially.

(1) A process of preparing, in the imaging module which includes the lens unit 11 which has the lens group, and the imaging element unit 13 which is fixed to the lens unit 11 and has the imaging element 27 in which the pixel pitch is 1 μm or less, the lens unit 11 and the imaging element unit 13, in which the lens unit 11 including the focus driving unit which displaces at least a portion of the plurality of lenses configuring the lens group with respect to the imaging element 27, the housing 23 in which the focus driving unit is accommodated, the unit connection portion 37A which is electrically connected to the imaging element unit 13, the first wiring portion by which the focus driving unit and the unit connection portion 37A are electrically connected to each other, and the second wiring portion which is electrically connected to the focus driving unit to which the first wiring portion is connected, and setting the lens unit 11 and the imaging element unit 13 which images an image of the measurement chart formed by the lens unit 11 using the imaging element 27 on the axis orthogonal to the measurement chart.

(2) A process of obtaining a captured image by performing imaging in the state where at least one of the measurement chart, the lens unit 11, and the imaging element unit 13 sequentially moves to a plurality of imaging positions and the lens is driven using the second wiring portion at each imaging position.

(3) A process of calculating an adjustment amount by which the position and the posture of the lens unit 11 and the imaging element unit 13 are adjusted using the captured image obtained at each imaging position.

(4) A process of moving the lens unit 11 and the imaging element unit 13 relative to each other according to the calculated adjustment amount.

(5) A process of cutting a portion including the wire of the second wiring portion.

Figure 8:
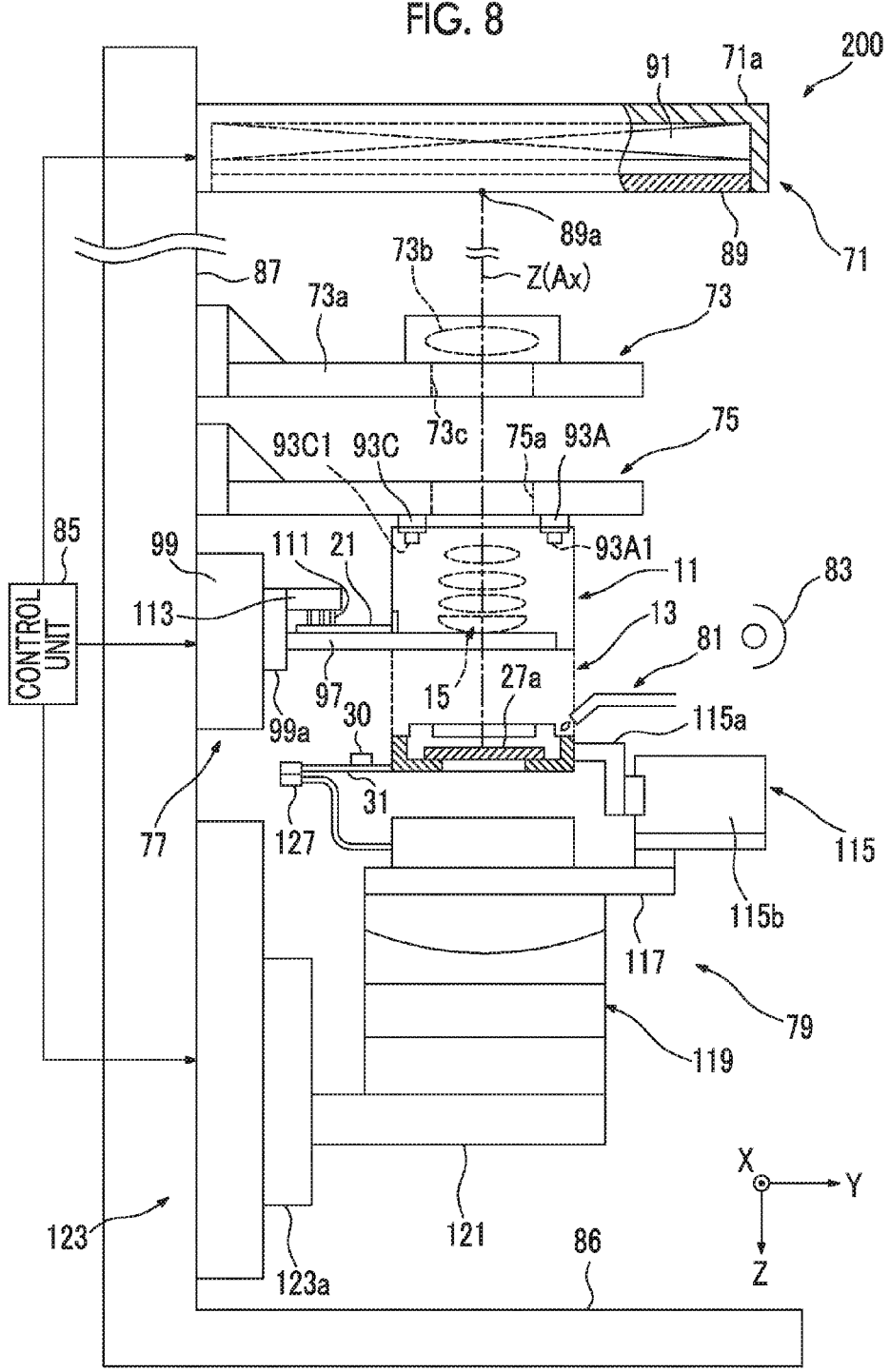
FIG. 8 is a schematic view showing a configuration of an imaging module manufacturing apparatus.

FIG. 8 is a schematic view showing the configuration of the imaging module manufacturing apparatus. An imaging module manufacturing apparatus 200 adjusts the position of the imaging element unit 13 with respect to the lens unit 11, and fixes the imaging element unit 13 and the lens unit 11 to each other after the adjustment.

For example, the imaging module manufacturing apparatus 200 includes a chart unit 71, a collimator unit 73, a lens positioning plate 75, a lens holding mechanism 77, an element movement mechanism 79, an adhesive agent supply portion 81, an ultraviolet lamp 83, a substrate cutting portion (not shown) described below, and a control unit 85 which controls the above-described components. The components are installed on a common supporting post 87 which stands upright on a base 86.

The chart unit 71 is configured of a box-shaped housing 71a, a measurement chart 89 which is fitted so as to be fixed to the inner portion of the housing 71a, and a light source 91 which is incorporated into the housing 71a and illuminates the measurement chart 89 from the rear surface of the measurement chart 89. For example, the measurement chart 89 is formed of a plastic plate having light diffusibility.

The collimator unit 73 is disposed to face the chart unit 71 on a Y axis which is orthogonal to a center 89a of the measurement chart 89. The collimator unit 73 is configured of a bracket 73a which is fixed to the supporting post 87 and a collimator lens 73b. The collimator lens 73b has a function which collects light radiated from the chart unit 71 and positions a virtual image position of the measurement chart 89 with respect to the lens unit 11 at an arbitrary distance (for example, an infinity position or a standard photographic subject distance suitable for defined photographing of the lens unit 11).

For example, the lens positioning plate 75 is formed of a metal so as to have stiffness, and include an opening 75a through which light collected by the collimator unit 73 passes.

Figure 9:
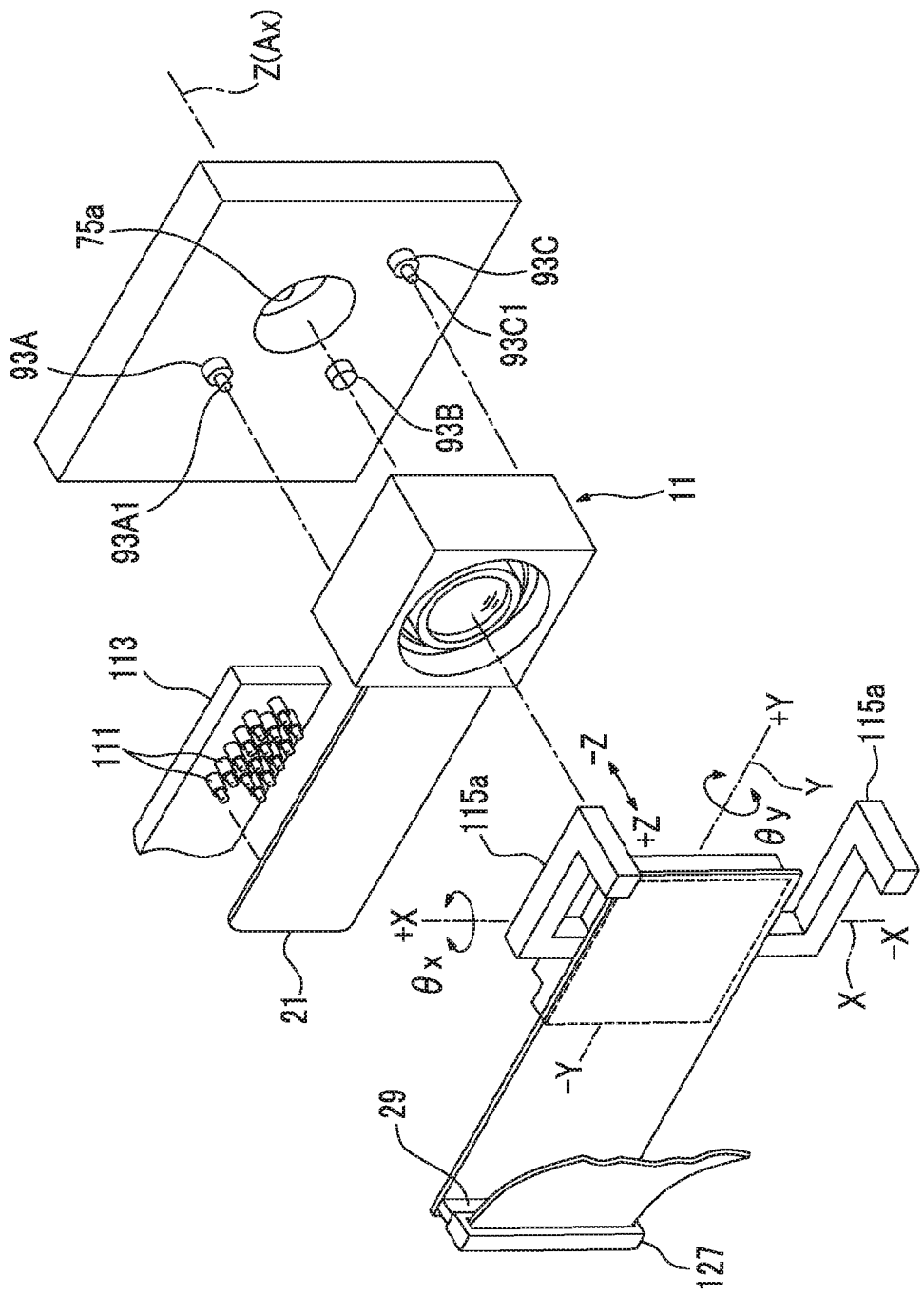
FIG. 9 is an explanatory view showing a state where the lens unit and the imaging element unit are held by the imaging module manufacturing apparatus.

FIG. 9 is an explanatory view showing a state where the lens unit and the imaging element unit are held by the imaging module manufacturing apparatus 200. As shown in FIG. 9, three fixing pins 93A, 93B, and 93C are provided around the opening portion 75a on a surface facing the lens holding mechanism 77 of the lens positioning plate 75.

Among the three fixing pins 93A, 93B, and 93C, insertion pins 93A1 and 93C1 having smaller diameters than those of the fixing pins are provided on the tips of two fixing pins 93A and 93C which are disposed on a diagonal line. The fixing pins 93A, 93B, and 93C are received by positioning surfaces 95A, 95B, and 95C of the lens unit 11 shown in FIG. 1, the insertion pins 93A1 and 93C1 are inserted into the positioning surfaces 95A1 and 95C1, and the lens unit 11 is positioned.

The lens holding mechanism 77 is configured of a holding plate 97 which holds the lens unit 11 so that a front surface of the lens unit 11 faces the chart unit 71 on the Z axis shown in FIG. 9, and a first slide stage 99 which moves the holding plate 97 in the Y axis direction.

A probe unit 113 including a plurality of probe pins 111 which come into contact with the adjustment terminal 59 provided in the flexible substrate 21 of the lens unit 11 is attached to the first slide stage 99 in a state of facing the holding plate 97. The probe unit 113 causes the rear surface opposite to the front surface, on which the adjustment terminal 59 of the flexible substrate 21 is provided, to come into contact with the holding plate 97, causes the probe pins 111 to come into contact with the adjustment terminal 59 provided on the front surface of the flexible substrate 21, and is electrically connected to the above-described lens drive unit 19 (refer to FIG. 5).

The first slide stage 99 is an electric precision stage. In the first slide stage, a ball screw is rotated by rotation of a motor (not shown), and a stage portion 99a which engages with the ball screw moves vertically.

The element movement mechanism 79 is configured of a chuck hand 115, a biaxial rotation stage 119, and a second slide stage 123. The chuck hand 115 holds the imaging element unit 13 so that the imaging surface 27a faces the chart unit 71 on the Z axis. The biaxial rotation stage 119 holds an approximately crank-shaped bracket 117 to which the chuck hand 115 is attached, and adjusts inclination of the imaging element unit 13 around two axes (X axis and Y axis) orthogonal to the Z axis. The second slide stage 123 holds a bracket 121 to which the biaxial rotation stage 119 is attached, and moves the bracket 121 in the Z axis direction.

The chuck hand 115 is configured of a pair of clamping members 115a which is bent in an approximately crank shape, and an actuator 115b which moves the clamping members 115a in the X axis direction orthogonal to the Z axis. The clamping members 115a are inserted into an outer frame 25 of the imaging element unit 13, and the imaging element unit 13 is held. In addition, the chuck hand 115 positions the imaging element unit 13 which is interposed by the clamping members 115a so that the lens optical axis Ax which is the center of the lens and the center position of the imaging surface 27a are substantially coincident with each other.

The biaxial rotation stage 119 is an electric twin-axis gonio stage, and inclines the imaging element unit 13 in a θx direction around the X axis and a θy direction around the Y axis orthogonal to the Z axis and the X axis by the rotations of two motors (not shown) with the center position of the imaging surface 27a as the rotation center. Accordingly, when the imaging element unit 13 is inclined in each direction, a positional relationship between the center position of the imaging surface 27a and the Z axis is not misaligned.

The second slide stage 123 functions as a measurement position movement mechanism which changes a measurement position, and moves the imaging element unit 13 in the Z axis direction via the biaxial rotation stage 119. In addition, since the second slide stage 123 has the same configuration as that of the first slide stage 99 except that the sizes are different from each other, or the like, detailed descriptions thereof are omitted.

A connector cable 127, which is connected to the external connection portion 29 provided on the tip of the element fixing substrate 31 of the imaging element unit 13, is attached to the biaxial rotation stage 119. The connector cable 127 inputs and outputs the driving signals input to the imaging element 27 and the imaging signals output from the imaging element 27.

After the positional adjustment of the lens unit 11 and the imaging element unit 13 ends, the adhesive agent supply portion 81 supplies an ultraviolet curing type adhesive agent to a gap between the lens unit 11 and the imaging element unit 13. The ultraviolet lamp 83 irradiates the ultraviolet curing type adhesive agent supplied to the gap with ultraviolet rays, and the adhesive agent is cured. Moreover, as the adhesive agent, in addition to the ultraviolet curing type adhesive agent, an instantaneous adhesive agent, a thermosetting adhesive agent, a natural curing adhesive agent, or the like may be used.

Moreover, in the imaging module manufacturing apparatus 200 having the above-described configuration, the lens unit 11 is fixed and the imaging element unit moves. However, the imaging element unit may be fixed and the lens unit 11 may move. That is, the movement for adjusting the positions and the postures of the lens unit 11 and the imaging element unit 13 may be any movement as long as the lens unit 11 and the imaging element unit 13 move relative to each other.

The above-described portions are connected to the control unit 85. For example, the control unit 85 is a microcomputer which includes a CPU, a ROM, a RAM, or the like, and controls each portion based on a control program stored in the ROM.

<Manufacturing Process by Imaging Module Manufacturing Apparatus>

Figure 10:
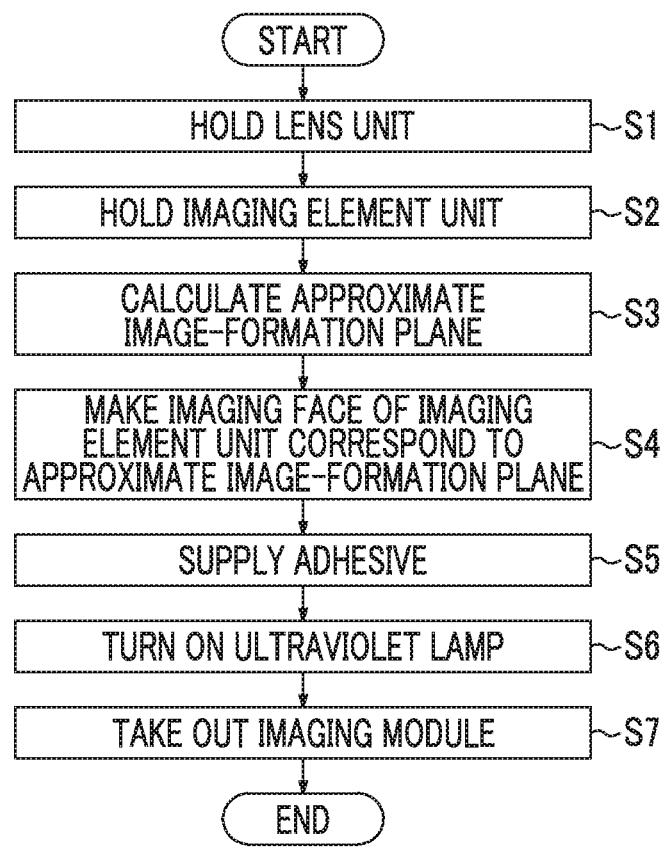
FIG. 10 is a flowchart showing a manufacturing process of an imaging module by the imaging module manufacturing apparatus.

Next, a manufacturing process of the imaging module will simply be described according to a flowchart of FIG. 10.

First, insertion pins 93A1 and 93C1 on the tip of the fixing pins 93A and 93C of the lens positioning plate 75 are inserted into the positioning holes 95A1 and 95C1 of the lens unit 11, by adjacent the lens positioning plate 75 and the lens unit 11, the fixing pins 93A, 93B, and 93C are received by positioning surfaces 95A, 95B, and 95C of the lens unit 11,and the lens unit 11 is held at a defined position with respect to the lens positioning plate 75 (S1). In this case, the probe unit 113 causes the probe pins 111 to come into contact with the adjustment terminal portion 63 of the lens unit 11.

In addition, the outer frame 125 of the imaging element unit 13 is interposed between the imaging element unit 13 and the clamping member 115a by the clamping member 115a of the chuck hand 115 so as to hold the imaging element unit 13 (S2).

After the holding of the lens unit 11 and the imaging element unit 13 is completed, the control unit calculates an approximate image forming surface by which a focusing point formed by the lens unit 11 is approximately obtained (S3). The approximate image forming surface is a surface in which focusing positions formed by the lens unit 11 are shown on one plane in a three-dimensional coordinate system.

The approximate image forming surface is schematically obtained as follows. First, the lens unit 11 moves to the plurality of imaging positions along the optical axis direction (Z axis direction), and the measurement chart 89 is imaged at each imaging position. From the captured images at the imaging positions obtained as above, the imaging position (Z coordinate) having the highest degree of focusing is obtained with respect to the plurality of positions (positions within an X-Y plane) within the screen of the captured images. In addition, when the Z coordinate having the highest degree of focusing with respect to each position within the screen is plotted on the X-Y plane, an approximate surface which is shown on one plane in the three-dimensional coordinate system of XYZ axes is calculated. This approximate surface is the approximate image forming surface, and for example, the approximate image forming surface is expressed by Expression of $aX+bY+cZ+d=0$ (a to d are arbitrary constants).

For example, since the details of the calculation method of the approximate image forming surface are disclosed in JP2010-21985A, refer to JP2010-21985A if necessary.

Next, the control unit drives the chuck hand 115 which holds the imaging element unit 13, and causes the image surface of the imaging element to coincide with the approximate image forming surface obtained as described above (S4). That is, the control unit adjusts the position and the posture of the imaging element unit 13 by changing the positions in the X, Y, and Z directions and the rotation angles of θx and θy while holding the imaging element unit 13 by the chuck hand 115.

As described above, after the lens unit 11 and the imaging element unit 13 are positioned by the control unit, the control unit supplies the ultraviolet curing type adhesive agent between the lens unit 11 and the imaging element unit 13 (S5), and lights the ultraviolet lamp (S6). The ultraviolet curing type adhesive agent is cured, and the lens unit 11 and the imaging element unit 13 are fixed at the adjusted position and posture.

The lens unit 11 and the imaging element unit 13 fixed to each other are removed from the imaging module manufacturing apparatus 200 (S7), and the imaging module is completed.

The lens unit 11 and the imaging element unit 13 are fixed to each other by the ultraviolet curing type adhesive agent. The curing of the ultraviolet curing type adhesive agent is used for temporary fixation between the lens unit 11 and the imaging element unit 13. For example, in a state where the lens unit 11 and the imaging element unit 13 are temporarily fixed to each other, the lens unit 11 and the imaging element unit 13 are discharged from the imaging module manufacturing apparatus 200, a desired process such as cleaning processing is performed, and thereafter, the lens unit 11 and the imaging element unit 13 are completely fixed to each other by a thermosetting type adhesive agent or the like, and the imaging module 100 may be manufactured.

In the imaging module manufacturing apparatus 200, the lens unit 11 is set in a state where the lens optical axis Ax is a vertical direction. The X direction VCM 45 and the Y direction VCM 49 are set in a horizontal plane. Accordingly, the X direction VCM 45 and the Y direction VCM 49 are hardly influenced by gravity. However, the Ax direction VCM 41 is influenced by gravity, and the lens group 15 is lowered in the vertical direction. Therefore, the control unit 85 drives at least the Ax direction VCM 41, and the control unit 85 performs the focus adjustment in a state where the lowering lens group 15 is lifted up in the vertical direction.

When the X direction VCM 45 and the Y direction VCM 49 are inclined in the horizontal direction due to slight errors of a set position and are influenced by gravity, in order to remove the influence, the control unit 85 may drive both the X direction VCM 45 and the Y direction VCM 49. In this case, it is possible to perform higher optical axis adjustment.

Moreover, when the X direction VCM 45 and the Y direction VCM 49 are not driven and only the Ax direction VCM 41 is driven, it is possible to limit the second wiring portion EW2 to wires for only the VCMs in which at least driving is required. That is, the number of wires of the above-described second wiring portion EW2 is reduced to a necessary minimum number, and it is possible to simplify the configuration of the imaging module 100.

When the imaging module manufacturing apparatus 200 is set in a state where the lens optical axis Ax of the lens unit 11 is the horizontal direction, the Ax direction VCM 41 is hardly influenced by gravity. However, when the movement direction of the X direction VCM 45 is coincident with the vertical direction, the X direction VCM 45 is influenced by gravity, and the lens group 15 is lowered in the vertical direction. In addition, when the movement direction of the Y direction VCM 49 is coincident with the vertical direction, the Y direction VCM 49 is influenced by gravity, and the lens group 15 is lowered in the vertical direction. Moreover, when the movement directions of the X direction VCM 45 and the Y direction VCM 49 are directions different from the vertical direction and the horizontal direction, both the X direction VCM 45 and the Y direction VCM 49 are influenced by gravity, and the lens group 15 is lowered in the vertical direction.

Accordingly, the control unit 85 drives all VCMs which are influenced by gravity, and lifts up the lowering lens group 15 in the vertical direction. In this case, the influence of gravity is cancelled out, and it is possible to perform the optical axis adjustment with high accuracy. In addition, it is not necessary to provide the wires corresponding to the VCMs in which the driving is not required, the number of wires of the second wiring portion EW2 is reduced to a necessary minimum number, and it is possible to simplify the configuration of the imaging module.

Particularly, in this case, in the imaging module manufacturing apparatus 200, the lens unit 11 and the imaging element unit 13 are supported at the same posture as the posture when a user of the imaging module made to be a product performs photographing. That is, the lens optical axis Az of the lens unit 11 is parallel to the Z axis, and the driving direction performed by the X direction VCM is parallel to the horizontal direction. In this case, the Ax direction VCM and the X direction VCM are not influenced by gravity, and only the Y direction VCM is influenced by gravity. Accordingly, the movement of the lens performed by each driving unit during the adjustment is subjected to the same influence as the influence of gravity when a product is used, and it is possible to perform the adjustment with higher accuracy.

In addition, the imaging module manufacturing apparatus and the imaging module manufacturing method are examples, and the lens unit 11 and the imaging element unit 13 may be fixed to each other using other apparatuses or methods.

<Cutting Process of Flexible Substrate>

Next, the cutting process of the flexible substrate 21 will be described. When the flexible substrate 21 is cut using scissors or the like, there is a concern that the wires may be crushed and be short-circuited. Accordingly, the flexible substrate 21 is cut by an ultrasonic cutter in which the wire is not short-circuited during the cutting.

After the lens unit 11 and the imaging element unit 13 are fixed to each other by the adhesive agent, the control unit 85 inserts a substrate cutting portion (not shown) from a side orthogonal to the Z axis of the imaging module manufacturing apparatus 200 shown in FIG. 8 into a portion between the holding plate 97 and the lens positioning plate 75.

Figure 11:
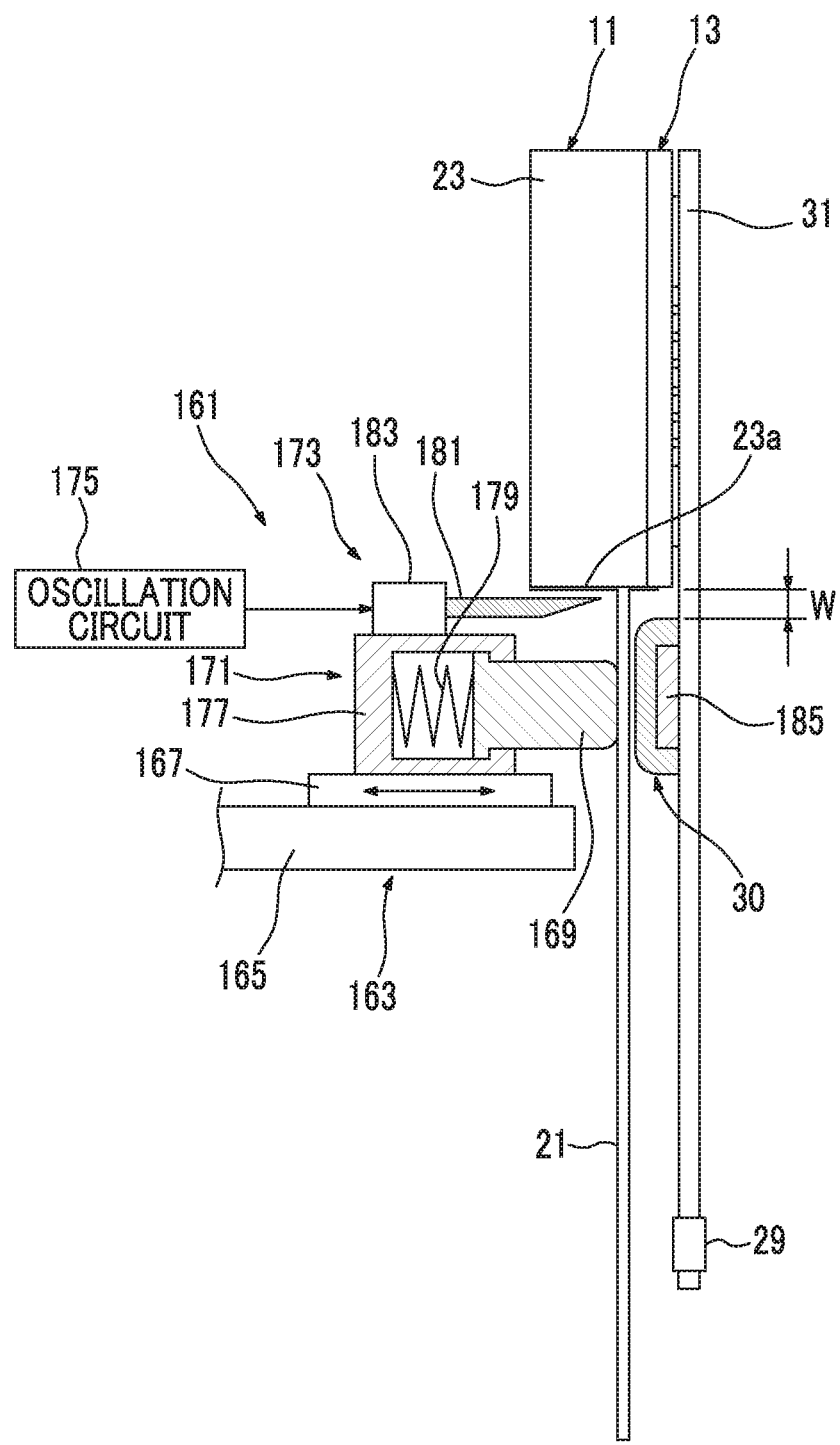
FIG. 11 is a schematic configuration view showing a schematic configuration of the substrate cutting portion and the imaging module.

FIG. 11 is a schematic configuration view showing a schematic configuration of the substrate cutting portion and the imaging module. The substrate cutting portion 161 includes a head portion 163 and a holding member (not shown) which supports the head portion 163. The holding member is fixed to the supporting post 87 shown in FIG. 8, and the head portion 163 is provided so as to be movable forward and backward between a cutting position between the holding plate 97 and the lens positioning plate 75, and a retreated position separated from the Z axis.

The head portion 163 includes a plate 165 which is connected to the holding member, a stage 167 which is slidable in a direction approaching or separating from the flexible substrate 21, a pressing mechanism 171 which includes a pressing member 169 coming into contact with the flexible substrate 21, and an ultrasonic cutter 173. The pressing mechanism 171 and the ultrasonic cutter 173 are fixed to the stage 167. The ultrasonic cutter 173 is connected to an oscillation circuit 175 which is driven by instruction of the control unit 85. The protrusion 30 of the element fixing substrate 31, which is disposed at the position facing the pressing member 169, uses an electronic component 185 such as an IC. The outer surface of the electronic component 185 is coated by an electromagnetic shield material.

The pressing mechanism 171 includes the pressing member 176, a holding portion 177 in which the pressing member 176 is accommodated, and a spring 179 which elastically biases the pressing member 176. The pressing member 169 is supported by the holding portion 177 so as to be retractable toward the element fixing substrate 31.

The ultrasonic cutter 173 includes a cutter blade 181, a cutter holder 183 which includes an ultrasonic vibrator to which the cutter blade 181 is mounted, and the oscillation circuit 175. When oscillation output is supplied from the oscillation circuit 175 to the ultrasonic vibrator, the cutter blade 181 is ultrasonic-vibrated, and a member which comes into contact with the cutter blade 181 is cut. The cutter holder 183 is disposed on a slider (not shown), and supports the cutter blade 181 such that the cutter blade 181 can move in a width direction orthogonal to the extension direction of the flexible substrate 21.

A procedure of cutting the flexible substrate 21 using the substrate cutting portion 161 having the above-described configuration is as follows.

The control unit 85 moves the head portion 163 of the substrate cutting portion 161 to the position facing the flexible substrate 21 which extends from the housing 23 of the lens unit 11. The pressing member 169 of the head portion 163 is set to the position facing the protrusion 30 of the element fixing substrate 31 so that the flexible substrate 21 can be interposed between the pressing member 169 and the protrusion 30. The cutter blade 181 is disposed within a range of a distance W from the side surface 23a of the housing 23 of the lens unit 11 to the end of the lens unit 11 side of the protrusion 30 on the element fixing substrate 31.

In this case, the lens unit 11 and the imaging element unit 13 including the element fixing substrate 31 are held by the holding plate 97 (refer to FIG. 8).

The control unit 85 drives the stage 167, and moves the pressing member 169 to the position at which the pressing member 169 comes into contact with the flexible substrate 21. Accordingly, the flexible substrate 21 is interposed between the pressing member 169 and the protrusion 30 of the element fixing substrate 31, and the pressing member 169 elastically biases the flexible substrate 21 to the protrusion 30 side by the spring 179. In this case, since the top surface of the protrusion 30 has a flat surface, the flexible substrate 21 can be held in a state where the flexible substrate 21 is flat so as not to be distorted.

Next, in a state where the flexible substrate 21 is fixed between the pressing member 169 and the protrusion 30 by the pressing member 169, the control unit 85 drives the oscillation circuit 175 so as to ultrasonically vibrate the cutter blade 181. In addition, the control unit 85 drives the stage 167 and moves the cutter blade 181 toward the flexible substrate 21.

When the stage 167 moves toward the flexible substrate 21, the cutter blade 181 cuts the flexible substrate 21. In addition, since the cutter holder 183 moves in the width direction (direction perpendicular to a paper surface of FIG. 11) of the flexible substrate 21, two ends 39 and 39 (refer to FIG. 1) are cut. During this cutting, the pressing member 169 continuously presses the flexible substrate 21 while pushing the spring 179 rearward.

FIGS. 12A to 12C are process explanatory views showing the cutting process of the flexible substrate 21 stepwise. As shown in FIG. 12B, the flexible substrate 21 shown in FIG. 12A is cut at the position of the cutting line C1 by the ultrasonic cutter 173. In the flexible substrate 21, a distance L from the cutting line C1 to the tip of the extension side of the element fixing substrate 31 becomes a cut off region. After the flexible substrate 21 is cut, as shown in FIG. 12C, insulation treatment is performed on the cut ends 39 of the flexible substrate 21. The insulation treatment with respect to the ends 39 is performed by coating an insulating material 187 such as a resin material on the ends 39. By performing the insulation treatment on the ends 39, the wires exposed to the cut surface are covered, and it is possible to prevent the occurrence of a short circuit or leaked current. In addition, when the imaging module is incorporated into the electronic device, it is possible to prevent occurrence of malfunction.

The insulation treatment may be performed by coating the insulating material 187 on the flexible substrate 21 using a dispenser after the flexible substrate 21 is ultrasonic-cut, or by spray-coating the insulating material 187. In addition to this, in a state where the insulating material is coated on the cutter blade 181 shown in FIG. 11 in advance, the insulating material attached to the cutter blade 181 may be attached to the ends 39 when the ultrasonic cutting is performed.

As described above, in the imaging module 100 which is manufactured using the imaging module manufacturing apparatus 200 and the substrate cutting portion 161, the adjustment terminal portion 63 is provided in the flexible substrate 21 extending from the lens unit 11. Accordingly, even when a miniaturized lens unit 11 is used, the terminal area of each terminal of the adjustment terminal portion is not decreased, and it is possible to simply and reliably perform probing. Therefore, it is possible to fix the lens unit 11 and the imaging element unit 13 to each other with high accuracy.

In addition, when the positional adjustment of the lens unit 11 and the imaging element unit 13 is performed, since all processes with respect to obtaining of the focusing coordinate value at each imaging position, calculating of the approximate image forming surface, calculating of the adjustment value based on the approximate image forming surface, focus adjustment, tilt adjustment, and fixing of the lens unit 11 and the imaging element unit 13 are automatically performed, it is possible to manufacture a mass-production type imaging module 100 having an image quality of a predetermined level or more on a mass scale in a short time. In addition, since the adjustment terminal portion 63, which is used when the lens unit 11 and the imaging element unit 13 are fixed to each other and is not required after the fixing, is cut from the flexible substrate 21 after the fixing, it is possible to efficiently and simply configure a finished product of the imaging module 100.

In addition, the imaging module manufacturing apparatus and the imaging module manufacturing method are examples, and using other apparatuses or other manufacturing methods, the lens unit 11 and the imaging element unit 13 may be fixed to each other and a portion of the flexible substrate 21 may be cut.

<Modification Example of Imaging Module>

Next, a modification example of the imaging module will be described.

Figure 13:
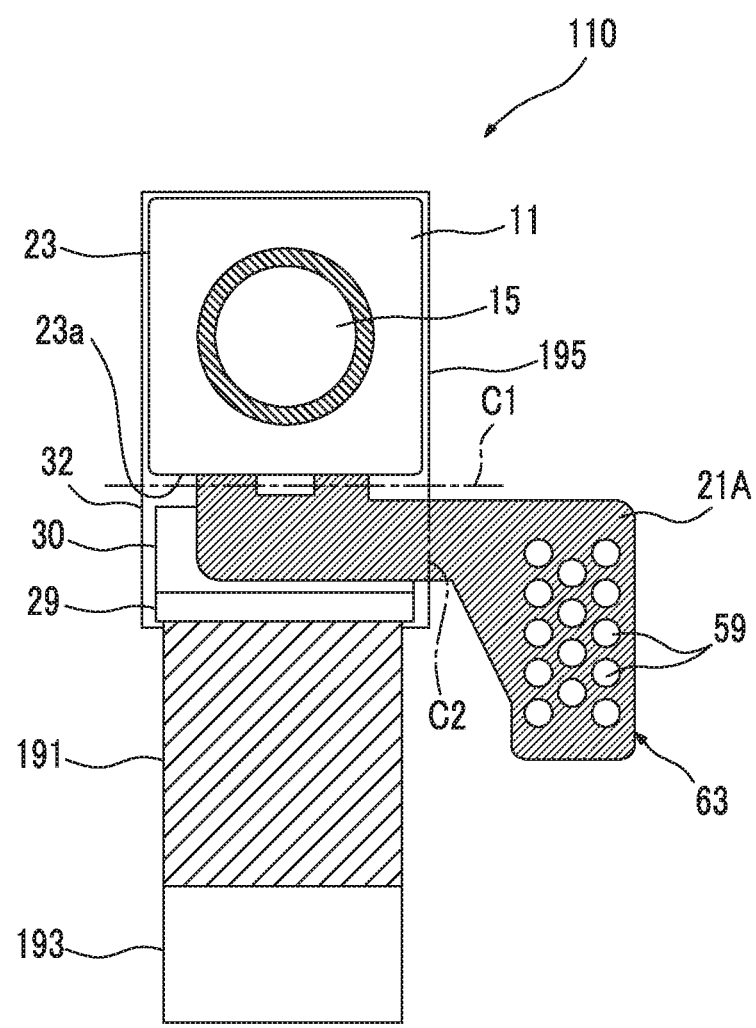
FIG. 13 is a plan view showing a modification example of the imaging module.

FIG. 13 is a plan view showing the modification example of the imaging module. Similarly to the above-described flexible substrate, a flexible substrate 21A of an imaging module 110 of the present modification example includes an extension portion which extends outside the housing 23 of the lens unit 11. The extension portion of the flexible substrate 21A extends from the side surface 23a which is the side on which the external connection portion 29 and the protrusion 30 of the element fixing substrate 32 of the housing 23 is disposed.

In addition, the extension portion of the flexible substrate 21A also extends in the direction orthogonal to the extension direction from the housing 23, and the adjustment terminal portion 63 is disposed in a region in which the flexible substrate 21A extends in the orthogonal direction. According to this configuration, when the size in the longitudinal direction of the element fixing substrate 32 is small, the flexible substrate 21A extends to the side in the extension direction from the housing 23, and it is possible to secure a wide disposition space of the adjustment terminal portion 63.

In addition, since the adjustment terminal portion 63 is disposed before the flexible substrate 21A extends to the side in the extension direction from the housing 23, a degree of freedom of disposition with respect to the probe unit 113 (refer to FIG. 8) of the imaging module manufacturing apparatus increases, unlike a case where the flexible substrate 21A is disposed in a plane perpendicular to the Z axis, and it is possible to dispose the adjustment terminal portion 63 in a wide space. Accordingly, even when the number of terminals of the adjustment terminal 59 increases, it is possible to secure necessary and sufficient sizes of each terminal area of the adjustment terminal 59.

In this case, in the element fixing substrate 32, the external connection portion 29 is disposed so as to be adjacent to the protrusion 30, and the external connection portion 29 is connected to an extension flexible substrate 191. An actual wiring connection portion 193 is provided on the tip of the extension flexible substrate 191. The actual wiring connection portion 193 may have the same configuration as that of the external connection portion 29 of the element fixing substrate, and may be a film substrate surface having a die-bonded connection pad.

In the imaging module 110 of the present configuration, the position, at which the flexible substrate 22 is cut, may be the cutting line C1 which is the same as the above-described line. However, the position, at which the flexible substrate 22 is cut, may be a cutting line C2 along an outer surface 195 of the element fixing substrate 32 becoming a boundary line at which the flexible substrate 22 comes off from the substrate surface of the element fixing substrate 32. That is, as long as the flexible substrate 22 after a portion thereof is cut is disposed within a region in which the flexible substrate 22 overlaps the element fixing substrate 32 in the direction of the lens optical axis Ax (the normal direction of the substrate surface of the element fixing substrate 32), the flexible substrate 22 does not interfere with the surroundings, and it is possible to improve miniaturization of the imaging module 110.

The configuration of the flexible substrate may include various modification examples.

Figure 14:
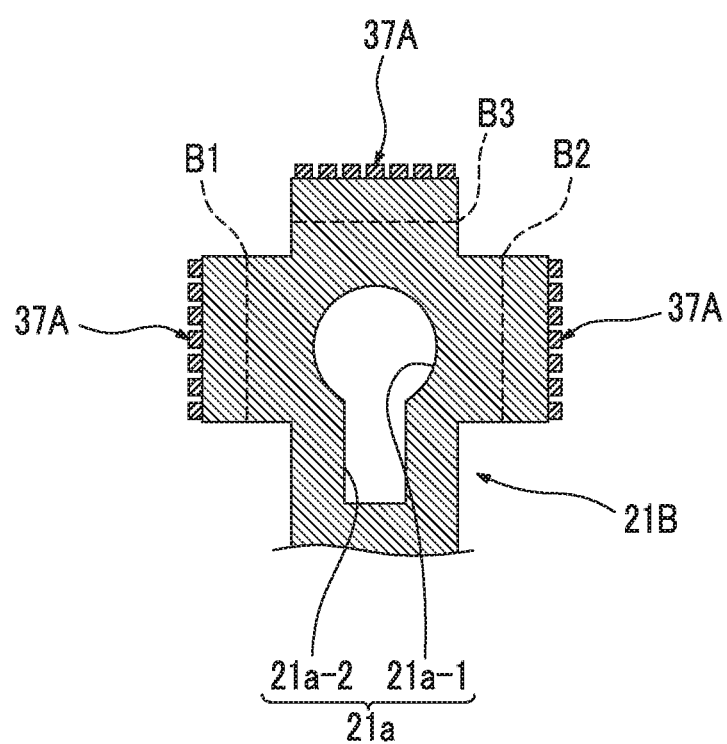
FIG. 14 is a partial plan view showing a portion of the flexible substrate in which unit connection portions are provided in three directions.

FIG. 14 is a partial plan view showing a portion of the flexible substrate in which the unit connection portions 37A are provided in three directions. In this case, a flexible substrate 21B is perpendicularly bent at folding lines B1, B2, and B3. In addition, each of three unit connection portions 37A disposed on the flexible substrate 21B is suspended with respect to three unit connection portions (not shown) correspondingly provided on the element fixing substrate side, and is disposed so as to face each of the unit connection portions.

According to this configuration, since the number of the unit connection portions 37A of the lens unit increases, this configuration can easily cope with a case where the number of connection terminals increases according to high functionality of the lens unit. In this case, each connection terminal is not miniaturized, and it is not necessary to increase positioning accuracy of the mutual side which is electrically connected to the unit connection portion 37A.

Figure 15A:
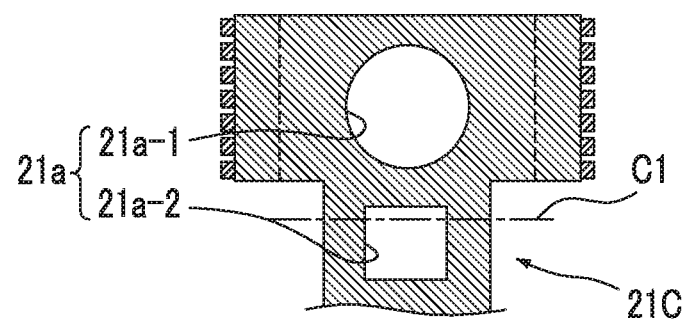
FIGS. 15A and 15B are partial plan views of a portion of the flexible substrate showing a modification example of an opening portion of the flexible substrate.
Figure 15B:
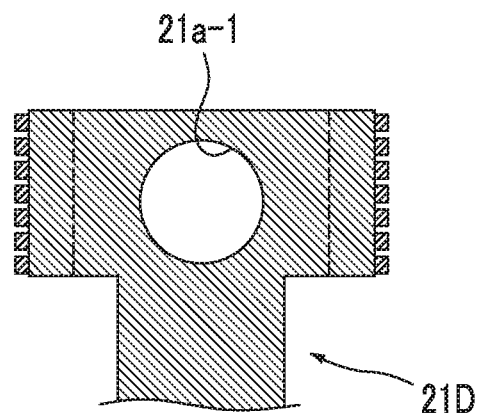

FIGS. 15A and 15B are partial plan views showing a portion of the flexible substrate showing a modification example of the opening portion of the flexible substrate. In a flexible substrate 21C shown in FIG. 15A, the opening portion 21a is configured of the circular hole portion 21a-1, and the rectangular hole portion 21a-2 which is formed so as to be separated from the circular hole portion 21a-1. In this case, when the flexible substrate 21C is cut, a tensile force acts on the inner circumference of the circular hole portion 21a-1 into which the lens barrel 17 (refer to FIG. 2) is inserted. However, since the circular hole portion 21a-1 is independently formed, deformation of the circular hole portion 21a-1 is prevented. As a result, it is possible to correctly cut the flexible substrate 21C along the cutting line C1.

In a flexible substrate 21D shown in FIG. 15B, the rectangular hole portion is not provided, and only the circular hole portion 21a-1 is formed. In this case, when the flexible substrate 21D is cut, it is possible to prevent the cutting position of the flexible substrate 21D from being deviated.

In addition, in the lens unit 11, the aspect in which the lens drive unit 19, the unit connection portion 37A, and the flexible substrate 21 are electrically connected to one another is not limited to the aspect in which a second wire in which the lens drive unit 19 and the flexible substrate 21 including the adjustment terminal portion are connected to each other is branched from the intermediate portion of a first wire in which the lens drive unit 19 and the unit connection portion 37A are connected to each other.

FIGS. 16A to 16E are schematic configuration views of the lens unit showing examples of a connection aspect between the first wire and the second wire. FIG. 16A shows a connection aspect in which the second wiring portion EW2 is branched from the intermediate of the first wiring portion EW1 as described above. The first wiring portion EW1 has at least a portion of a common wire WEc which is used for the first wiring portion EW1 and the second wiring portion EW2. In this case, it is possible to save wiring members due to a common use of the wires.

FIG. 16B shows a connection aspect in which a block of the lens drive unit 19 is connected to the flexible substrate 21 through die bonding. The first wiring portion EW1 is similar to that of FIG. 16A, and the second wiring portion EW2 is configured so as to include a die-bond connection portion. In this case, it is possible to simply connect the second wiring portion EW2 to the flexible substrate 21 electrically.

FIG. 16C shows a connection aspect in which the second wiring portion EW2 with respect to the flexible substrate 21 is provided by extending the first wiring portion EW1 via the unit connection portion 37A. In this case, both the first wiring portion EW1 and the second wiring portion EW2 are connected to the unit connection portion 37A. That is, the unit connection portion 37A is configured so as to be provided at the intermediate portion of the wire of one system.

FIG. 16D shows a connection aspect in which the first wiring portion EW1 and the second wiring portion EW2 are connected to the lens drive unit 19 by the wire independent from each other with the lens drive unit 19. In this case, regardless of the first wiring portion EW1, it is possible to wire the second wiring portion EW2 in a different direction. Accordingly, layout of the wire is easily performed, and it is possible to improve a degree of freedom with respect to design.

FIG. 16E shows a connection aspect in which a plurality of wire lines (two systems in the shown example) which electrically connects the unit connection portion 37A and the flexible substrate 21 are previously provided on a substrate PB on which the block of the lens drive unit 19 is mounted, and the lens drive unit 19 is selectively connected to any one of the wire lines. In this case, a first wire line EL1 which is formed on the substrate PB is connected to the wire, which is electrically connected to the unit connection portion 37A of the lens drive unit 19, by a connection portion 197A, and the first wire line EL1 functions as the first wiring portion EW1. A second wire line EL2 is connected to the wire, which is electrically connected to the flexible substrate 21 of the lens drive unit 19, by a connection portion 197B, and the second wire line EL2 functions as the second wiring portion EW2.

According to this configuration, the first wiring portion EW1 and the second wiring portion EW2, which are electrically connected to the lens drive unit 19, can be separately formed, and each wire can be formed using a simple process such as performing a solder connection at the connection portions 197A and 197B. In addition, the substrate PB may be configured so as to be used commonly with the flexible substrate 21. In this case, it is possible to reduce the number of components.

In all of the above-described flexible substrates 21, each flexible substrate 21 is configured so as to extend in the direction facing the external connection portion 29 of the element fixing substrate 31 from the housing 23 of the lens unit 11. However, the present invention is not limited to this.

Figure 17A:
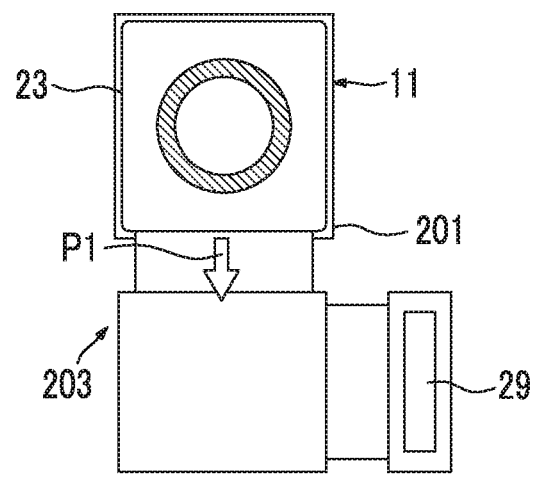
FIGS. 17A and 17B are schematic plan views of the imaging modules showing modification examples of element fixing substrates.
Figure 17B:
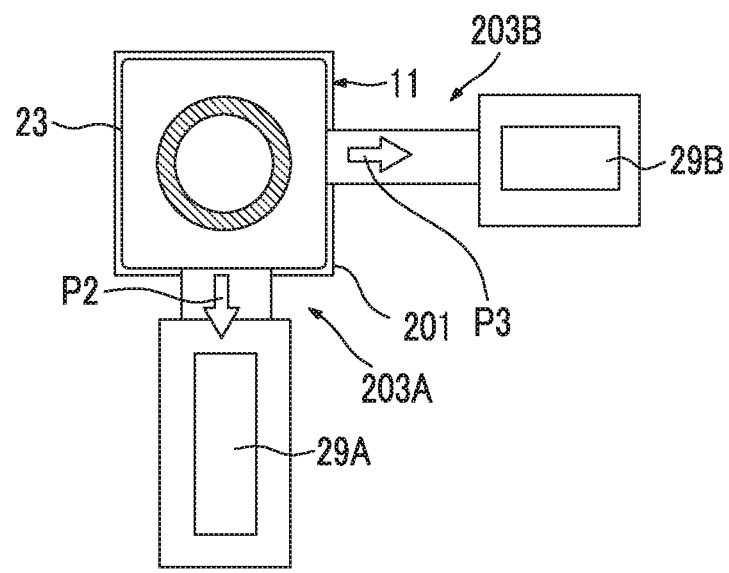

FIGS. 17A and 17B are schematic plan views of the imaging module showing modification examples of the element fixing substrate. As shown in FIG. 17A, an element fixing substrate includes a support portion 201 which supports the imaging element, the external connection portion 29 which is electrically connected to the outside of the imaging element unit, and an element wiring portion 203 which electrically and physically connects the support portion 201 and the external connection portion 29. In this case, the flexible substrate extends from the housing 23 in the direction in which the element wiring portion 203 extends from the support portion 201. That is, the flexible substrate may extend in a direction shown by arrow P1 in the drawing.

In addition, as shown in FIG. 17B, the element fixing substrate includes the support portion 201 which supports the imaging element, external connection portions 29A and 29B which are electrically connected to the outside of the imaging element unit, an element wiring portion 203A which electrically and physically connects the support portion 201 and the external connection portion 29A, and an element wiring portion 203B which electrically and physically connects the support portion 201 and the external connection portion 29B. In this case, in a direction P2 in which the element wiring portion 203A is connected to the support portion 201 and a direction P3 in which the element wiring portion 203B extends from the support portion 201, the flexible substrate may extend in at least one of the directions.

The above-described imaging module is supported by a support member such as a substrate (not shown), is disposed in a housing of an electronic device such as a digital camera or an on-vehicle camera, and is provided as an imaging device. In addition to the above-described electronic device, for example, as an object into which the imaging module is incorporated, for example, there is a camera built-in Personal Computer (PC), an external type camera for a PC, an interphone with a camera, or electronic devices such as a portable terminal device having a photographing function. For example, as the portable terminal device, there is a portable phone, a smart phone, Personal Digital Assistants (PDA), a portable game console, a wrist watch type terminal device, a spectacle type terminal device which is mounted on a head and has a display on a lens portion of a spectacle, or the like.

The present invention is not limited to the above-described embodiments, and modifications or applications which are performed by a person skilled in the art based on the combinations of configurations of the embodiments, descriptions of the present specification, and well-known technologies are included in the present invention and are included within scopes for which protection is sought.

For example, in addition to the second wiring portion being formed of the flexible substrate 21, the second wiring portion may be formed of a cable in which an insulating layer is coated on the outside of wires, or other cuttable wiring substrates.

The present invention discloses the following matters.

(1) An imaging module, including: a lens unit which has a lens group; and an imaging element unit which is fixed to the lens unit and has an imaging element, wherein the lens unit includes, a focus driving unit which displaces at least a portion of a plurality of lenses configuring the lens group in an optical axis direction of the lens group with respect to the imaging element, a housing in which the focus driving unit is accommodated, a first connection portion which is electrically connected to the imaging element unit, a first wiring portion by which the focus driving unit and the first connection portion are electrically connected to each other, and a second wiring portion which is electrically connected to the focus driving unit to which the first wiring portion is connected, wherein the second wiring portion extends from the inside of the housing to the outside thereof, and a wire of the second wiring portion extends to an end surface on an end of the extended second wiring portion.

(2) The imaging module according to (1), further including:

a first image-blur correction driving unit which drives at least a portion of the plurality of lenses configuring the lens group in a first direction in a plane perpendicular to the optical axial direction of the lens group; and a second image-blur correction driving unit which drives the lenses in a second direction orthogonal to the first direction in the plane perpendicular to the optical axial direction of the lens group.

(3) The imaging module according to (1) or (2), wherein the second wiring portion is configured so as to include a flexible substrate.

(4) The imaging module according to any one of (1) to (3), wherein the second wiring portion extends from an opening formed in the housing to the outside of the housing.

(5) The imaging module according to (1) to (4), wherein the second wiring portion is disposed at a position in which a projection area with respect to the second wiring portion in the case where the second wiring portion is projected in the optical axis direction of the lens group is within a projection area of the imaging element unit in the case where the imaging element unit is projected in the optical axis direction.

(6) The imaging module according to any one of (1) to (5), wherein at least the end surface of the wire of the second wiring portion on the extended end of the second wiring portion is covered by an insulating material.

(7) The imaging module according to any one of (1) to (6), wherein the imaging element unit includes a support portion which supports the imaging element, an external connection portion which is electrically connected to the outside of the imaging element unit, and an element wiring portion by which the support portion and the external connection portion are connected to each other, and wherein a direction in which the second wiring portion extends is a direction in which the element wiring portion extends from the support portion.

(8) The imaging module according to (7), wherein the imaging element unit includes a protrusion which is disposed on the same side as a side on which the support portion supports the imaging element, and wherein the extended end of the second wiring portion is disposed between the housing and the protrusion.

(9) The imaging module according to (8), wherein a top surface of the protrusion has a flat surface which is parallel to the imaging surface of the imaging element.

(10) The imaging module according to (8) or (9), wherein the protrusion is formed using an electronic component which is mounted on the support portion and the element wiring portion.

(11) The imaging module according to any one of (8) to (10), wherein a gap is provided between the housing and the protrusion.

(12) The imaging module according to any one of (1) to (11), wherein the second wiring portion extends from a side surface different from a side surface, on which the first connection portion is disposed, among side surfaces of the housing.

(13) The imaging module according to any one of (1) to (12), wherein the second wiring portion includes a plurality of divided wiring portions which are divided into at least two in a state where a center surface, which has an optical axis of the lens group along a plane and is parallel in a direction in which the second wiring portion extends from the housing, is interposed between the wiring portions.

(14) The imaging module according to any one of (1) to (13)

wherein a pixel pitch of the imaging element is 1 μm or less.

(15) An electronic device including the imaging module according to any one of (1) to (14).

(16) A manufacturing method of an imaging module including a lens unit which has a lens group, and an imaging element unit which is fixed to the lens unit and has an imaging element, the lens unit including a focus driving unit which displaces at least a portion of a plurality of lenses configuring the lens group with respect to the imaging element, a housing in which the focus driving unit is accommodated, a first connection portion which is electrically connected to the imaging element unit, a first wiring portion by which the focus driving unit and the first connection portion are electrically connected to each other, and a second wiring portion which is electrically connected to the focus driving unit to which the first wiring portion is connected, the manufacturing method of an imaging module including:

a process of preparing the lens unit and the imaging element unit;

a process of setting the lens unit and the imaging element unit on an axis orthogonal to a measurement chart;

a process of obtaining a captured image by imaging an image of the measurement chart, in which an image is formed by the lens unit using the imaging element, in a state where at least one of the measurement chart, the lens unit, and the imaging element unit sequentially moves to a plurality of imaging positions on the axis and the focus driving unit is driven using the second wiring portion;

a process of calculating an adjustment amount by which positions and postures of the lens unit and the imaging element unit are adjusted using the captured image obtained at each imaging position;

a process of moving the lens unit and the imaging element unit relative to each other according to the calculated adjustment amount;

a process of fixing the lens unit and the imaging element unit which are moved relative to each other; and a process of cutting a portion including the wire of the second wiring portion.

(17) The manufacturing method of an imaging module according to (16), wherein the second wiring portion is cut using an ultrasonic cutter.

(18) The manufacturing method of an imaging module according to (16) or (17), further including, a process of insulating a cut surface of the second wiring portion after cutting the second wiring portion.

(19) The manufacturing method of an imaging module according to any one of (16) to (18), wherein a pixel pitch of the imaging element is 1 μm or less.

EXPLANATION OF REFERENCES

11: lens unit
13: imaging element unit
15A, 15B, 15C, and 15D: lens
19: lens drive unit
19A: focus drive unit
19B: image-blur correction drive unit
21: flexible substrate
22a and 22b: divided wiring portion
23: housing
23a: side surface
27: imaging element
29: external connection portion
30: protrusion
31: element fixing substrate
37A and 37B: unit connection portion (first connection portion)
38: opening
39: end
59: adjustment connection terminal
63: adjustment connection portion
100: imaging module
161: substrate cutting portion
173: ultrasonic cutter
181: cutter blade
185: electronic component
187: insulating material
200: imaging module manufacturing apparatus
201: support portion
203, 203A, and 203B: element wiring portion
EW1: first wiring portion
EW2: second wiring portion

What is claimed is:

1. An imaging module, comprising: a lens unit which has a lens group; and an imaging element unit which is fixed to the lens unit and has an imaging element, wherein the lens unit includes, a focus driving unit which displaces at least a portion of a plurality of lenses configuring the lens group in an optical axis direction of the lens group with respect to the imaging element, a housing in which the focus driving unit is accommodated, a connection portion which is electrically connected to the imaging element unit, a first wiring portion by which the focus driving unit and the connection portion are electrically connected to each other, and a second wiring portion which is electrically connected to the focus driving unit to which the first wiring portion is connected, wherein the second wiring portion extends from the inside of the housing to the outside thereof, and a wire of the second wiring portion extends to an end surface on an end of the extended second wiring portion.

2. The imaging module according to claim 1, further comprising:

a first image-blur correction driving unit which drives at least a portion of the plurality of lenses configuring the lens group in a first direction in a plane perpendicular to the optical axial direction of the lens group; and a second image-blur correction driving unit which drives the lenses in a second direction orthogonal to the first direction in the plane perpendicular to the optical axial direction of the lens group.

3. The imaging module according to claim 1,
wherein the second wiring portion is configured so as to include a flexible substrate.

4. The imaging module according to claim 2,
wherein the second wiring portion is configured so as to include a flexible substrate.

5. The imaging module according to claim 1,
wherein the second wiring portion extends from an opening formed in the housing to the outside of the housing.

6. The imaging module according to claim 1,
wherein the second wiring portion is disposed at a position in which a projection area with respect to the second wiring portion in the case where the second wiring portion is projected in the optical axis direction of the lens group is within a projection area of the imaging element unit in the case where the imaging element unit is projected in the optical axis direction.

7. The imaging module according to claim 1,
wherein at least the end surface of the wire of the second wiring portion on the extended end of the second wiring portion is covered by an insulating material.

8. The imaging module according to claim 1,
wherein the imaging element unit includes a support portion which supports the imaging element, an external connection portion which is electrically connected to the outside of the imaging element unit, and an element wiring portion by which the support portion and the external connection portion are connected to each other, and wherein a direction in which the second wiring portion extends is a direction in which the element wiring portion extends from the support portion.

9. The imaging module according to claim 8,
wherein the imaging element unit includes a protrusion which is disposed on the same side as a side on which the support portion supports the imaging element, and wherein the extended end of the second wiring portion is disposed between the housing and the protrusion.

10. The imaging module according to claim 9,
wherein a top surface of the protrusion has a flat surface which is parallel to the imaging surface of the imaging element.

11. The imaging module according to claim 9,
wherein the protrusion is formed using an electronic component which is mounted on the support portion and the element wiring portion.

12. The imaging module according to claim 9,
wherein a gap is provided between the housing and the protrusion.

13. The imaging module according to claim 1,
wherein the second wiring portion extends from a side surface different from a side surface, on which the connection portion is disposed, among side surfaces of the housing.

14. The imaging module according to claim 1,
wherein the second wiring portion includes a plurality of divided wiring portions which are divided into at least two in a state where a center surface, which has an optical axis of the lens group along a plane and is parallel in a direction in which the second wiring portion extends from the housing, is interposed between the wiring portions.

15. The imaging module according to claim 1,
wherein a pixel pitch of the imaging element is 1 µm or less.

16. An electronic device including the imaging module according to claim 1.

17. A manufacturing method of an imaging module according to claim 1 including a lens unit which has a lens group, and an imaging element unit which is fixed to the lens unit and has an imaging element,
the lens unit including
the focus driving unit which displaces at least a portion of a plurality of lenses configuring the lens group with respect to the imaging element,
the housing in which the focus driving unit is accommodated,
the connection portion which is electrically connected to the imaging element unit,
the first wiring portion by which the focus driving unit and the connection portion are electrically connected to each other, and
the second wiring portion which is electrically connected to the focus driving unit to which the first wiring portion is connected,
the manufacturing method of an imaging module comprising:
a process of preparing the lens unit and the imaging element unit;
a process of setting the lens unit and the imaging element unit on an axis orthogonal to a measurement chart;
a process of obtaining a captured image by imaging an image of the measurement chart, in which an image is formed by the lens unit using the imaging element, in a state where at least one of the measurement chart, the lens unit, and the imaging element unit sequentially moves to a plurality of imaging positions on the axis and the focus driving unit is driven using the second wiring portion;
a process of calculating an adjustment amount by which positions and postures of the lens unit and the imaging element unit are adjusted using the captured image obtained at each imaging position;
a process of moving the lens unit and the imaging element unit relative to each other according to the calculated adjustment amount;
a process of fixing the lens unit and the imaging element unit which are moved relative to each other; and
a process of cutting a portion including the wire of the second wiring portion.

18. The manufacturing method of an imaging module according to claim 17,
wherein the second wiring portion is cut using an ultrasonic cutter.

19. The manufacturing method of an imaging module according to claim 17, further comprising,
a process of insulating a cut surface of the second wiring portion after cutting the second wiring portion.

20. The manufacturing method of an imaging module according to claim 17,
wherein a pixel pitch of the imaging element is 1 µm or less.

* * * * *